US010875361B2

(12) United States Patent
Furusawa

(10) Patent No.: US 10,875,361 B2
(45) Date of Patent: Dec. 29, 2020

(54) PNEUMATIC TIRE

(71) Applicant: The Yokohama Rubber Co., LTD., Tokyo (JP)

(72) Inventor: Hiroshi Furusawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 658 days.

(21) Appl. No.: 15/529,067

(22) PCT Filed: Dec. 3, 2015

(86) PCT No.: PCT/JP2015/084062
§ 371 (c)(1),
(2) Date: May 23, 2017

(87) PCT Pub. No.: WO2016/088855
PCT Pub. Date: Jun. 9, 2016

(65) Prior Publication Data
US 2018/0312010 A1 Nov. 1, 2018

(30) Foreign Application Priority Data

Dec. 3, 2014 (JP) .................................. 2014-245321
Sep. 7, 2015 (JP) .................................. 2015-175793

(51) Int. Cl.
*B60C 11/03* (2006.01)
*B60C 11/117* (2006.01)
*B60C 11/12* (2006.01)
(52) U.S. Cl.
CPC ........ *B60C 11/1204* (2013.01); *B60C 11/032* (2013.01); *B60C 11/033* (2013.01);
(Continued)

(58) Field of Classification Search
CPC ..................................................... B60C 11/032
See application file for complete search history.

(56) References Cited

U.S. PATENT DOCUMENTS 6,668,886 B1 * 12/2003 Iwamura ................. B60C 11/12
152/209.18
2005/0167022 A1 * 8/2005 Hashimoto ............. B60C 11/12
152/209.25
(Continued)

FOREIGN PATENT DOCUMENTS

DE 102010016906 A1 * 11/2011 ............. B60C 11/12
EP 2 612 770 7/2013
(Continued)

OTHER PUBLICATIONS

Machine Translation: JP-2008132873-A; Ochi, Naoya; (Year: 2019).*
(Continued)

*Primary Examiner* — Kendra Ly
(74) *Attorney, Agent, or Firm* — Thorpe North & Western

(57) ABSTRACT

A pneumatic tire is provided with, in the tread surface, land portions that include a rib or a plurality of blocks. The land portions are provided with a plurality of narrow shallow grooves and a plurality of recessed portions in a contact patch. The opening area ratio Se of the recessed portions in the end portion regions in the tire lateral direction of one continuous contact patch and the opening area ratio Sc of the recessed portions in the central portion region in the tire lateral direction have the relationship Sc<Se, where the central portion region is defined as the region in the central portion in the tire lateral direction occupying 50% of the continuous contact patch of the land portions, and the end portion regions are defined as the regions in the left and right end portions in the tire lateral direction occupying 25%.

23 Claims, 35 Drawing Sheets

(52) U.S. Cl.
CPC ...... *B60C 11/0306* (2013.01); *B60C 11/0332* (2013.01); *B60C 2011/036* (2013.01); *B60C 2011/0341* (2013.01); *B60C 2011/0355* (2013.01); *B60C 2011/0358* (2013.01); *B60C 2011/0362* (2013.01); *B60C 2011/0383* (2013.01); *B60C 2011/1213* (2013.01); *B60C 2011/1231* (2013.01)

(56) References Cited

U.S. PATENT DOCUMENTS

| | | |
|---|---|---|
| 2007/0006954 A1 | 1/2007 | Tsubono et al. |
| 2013/0186533 A1 | 7/2013 | Kaneko |
| 2014/0318677 A1 | 10/2014 | Kaneko et al. |

FOREIGN PATENT DOCUMENTS

| | | | | |
|---|---|---|---|---|
| JP | 04085108 A | * | 3/1992 | ........... B60C 11/032 |
| JP | 04218407 A | * | 8/1992 | ........... B60C 11/032 |
| JP | 2001-071712 | | 3/2001 | |
| JP | 2001138715 A | * | 5/2001 | |
| JP | 2002002222 A | * | 1/2002 | |
| JP | 2005-186649 | | 7/2005 | |
| JP | 3702958 | | 10/2005 | |
| JP | 2006-151228 | | 6/2006 | |
| JP | 2006-168498 | | 6/2006 | |
| JP | 2006-341770 | | 12/2006 | |
| JP | 2006341770 A | * | 12/2006 | |
| JP | 2007-015621 | | 1/2007 | |
| JP | 2008-030656 | | 2/2008 | |
| JP | 2008-062749 | | 3/2008 | |
| JP | 2008062749 A | * | 3/2008 | |
| JP | 2008132873 A | * | 6/2008 | |
| JP | 2009-274726 | | 11/2009 | |
| JP | 2011-011696 | | 1/2011 | |
| JP | 2011-088544 | | 5/2011 | |
| JP | 2011-148423 | | 8/2011 | |
| JP | 2011-148472 | | 8/2011 | |
| JP | 2011148472 A | * | 8/2011 | |
| JP | 2012-045974 | | 3/2012 | |
| JP | 2012-056478 | | 3/2012 | |
| JP | 2012056478 A | * | 3/2012 | |
| JP | 2014-094631 | | 5/2014 | |
| WO | WO 2012/029125 | | 3/2012 | |
| WO | WO 2013/046323 | | 4/2013 | |
| WO | WO 2013/047691 | | 4/2013 | |
| WO | WO 2015/086186 | | 6/2015 | |
| WO | WO 2016/000854 | | 1/2016 | |

OTHER PUBLICATIONS

Machine Translation: JP-2011148472-A; Hashimoto, Yoshimasa; (Year: 2020).*
Machine Translation: JP-2001138715-A; Matsuura, Shinichi; (Year: 2020).*
Machine Translation: JP-2008062749-A; Saeki, Kentaro; (Year: 2020).*
Machine Translation: JP-04218407-A; Tsuda, Toru; (Year: 2020).*
Machine Translation: JP-04085108-A;; Yoshino, Mitsuo; (Year: 2020).*
Machine Translation: JP-2006341770-A; Wada, Junichiro; (Year: 2020).*
Machine Translation: JP-2012056478-A; Koda, Kei; (Year: 2020).*
Machine Translation: JP-2002002222-A; Tomita, Arata; (Year: 2020).*
Machine Translation: DE-102010016906-A1; Lacko Michal; (Year: 2020).*
International Search Report for International Application No. PCT/JP2015/084062 dated Mar. 1, 2016, 4 pages, Japan.

* cited by examiner

VIEW ALONG LINE A-A

| | CONVENTIONAL EXAMPLE | EXAMPLE 1 | EXAMPLE 2 | EXAMPLE 3 | EXAMPLE 4 | EXAMPLE 5 |
|---|---|---|---|---|---|---|
| SIPE | YES | YES | YES | YES | YES | YES |
| CONFIGURATION OF NARROW SHALLOW GROOVE | PARALLEL (FIG. 4) | PARALLEL (FIG. 4) | PARALLEL (FIG. 4) | PARALLEL (FIG. 4) | PARALLEL (FIG. 4) | PARALLEL (FIG. 4) |
| GROOVE WIDTH OF NARROW SHALLOW GROOVE (mm) | 0.3 | 0.3 | 0.3 | 0.3 | 0.3 | 0.3 |
| PITCH P OF NARROW SHALLOW GROOVE (mm) | 1.2 | 1.2 | 1.2 | 0.8 | 1.2 | 1.2 |
| POSITION OF RECESSED PORTION | - | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK |
| SHAPE OF RECESSED PORTION | - | QUADRANGULAR | CIRCULAR | CIRCULAR | CIRCULAR | CIRCULAR |
| OPENING AREA OF RECESSED PORTION (mm$^2$) | - | 5.0 | 5.0 | 5.0 | 3.2 | 3.2 |
| DISPOSAL DENSITY DA OF RECESSED PORTION (UNIT/cm$^2$) | - | 0.8 | 0.8 | 0.8 | 0.8 | 2.0 |
| DISPOSAL NUMBER RATIO Ne/Nc OF RECESSED PORTION | - | 1.13 | 1.13 | 1.13 | 1.13 | 1.13 |
| DEPTH RATIO Hd/Hg OF RECESSED PORTION | - | 1.0 | 1.0 | 1.0 | 1.0 | 1.0 |
| BRAKING PERFORMANCE ON ICE | 100 | 110 | 115 | 118 | 125 | 128 |

FIG. 32A

| | EXAMPLE 6 | EXAMPLE 7 | EXAMPLE 8 | EXAMPLE 9 | EXAMPLE 10 | EXAMPLE 11 |
|---|---|---|---|---|---|---|
| SIPE | YES | YES | YES | YES | YES | YES |
| CONFIGURATION OF NARROW SHALLOW GROOVE | PARALLEL (FIG. 4) | PARALLEL (FIG. 4) | PARALLEL (FIG. 4) | PARALLEL (FIG. 4) | PARALLEL (FIG. 4) | PARALLEL (FIG. 4) |
| GROOVE WIDTH OF NARROW SHALLOW GROOVE (mm) | 0.3 | 0.3 | 0.3 | 0.3 | 0.3 | 0.3 |
| PITCH P OF NARROW SHALLOW GROOVE (mm) | 1.2 | 1.2 | 1.2 | 1.2 | 1.2 | 1.2 |
| POSITION OF RECESSED PORTION | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK |
| SHAPE OF RECESSED PORTION | CIRCULAR | CIRCULAR | CIRCULAR | CIRCULAR | CIRCULAR | CIRCULAR |
| OPENING AREA OF RECESSED PORTION (mm$^2$) | 3.2 | 3.2 | 3.2 | 3.2 | 3.2 | 3.2 |
| DISPOSAL DENSITY DA OF RECESSED PORTION (UNIT/cm$^2$) | 4.0 | 2.0 | 2.0 | 2.0 | 2.0 | 2.0 |
| DISPOSAL NUMBER RATIO Ne/Nc OF RECESSED PORTION | 1.13 | 3.00 | 1.50 | - | 1.50 | 1.50 |
| DEPTH RATIO Hd/Hg OF RECESSED PORTION | 1.0 | 1.0 | 1.0 | 0.5 | 1.5 | 1.5 |
| BRAKING PERFORMANCE ON ICE | 132 | 138 | 132 | 135 | 132 | 128 |

FIG. 32B

| | CONVENTIONAL EXAMPLE | EXAMPLE 12 | EXAMPLE 13 | EXAMPLE 14 | EXAMPLE 15 | EXAMPLE 16 |
|---|---|---|---|---|---|---|
| SIPE | YES | YES | YES | YES | YES | YES |
| CONFIGURATION OF NARROW SHALLOW GROOVE | PARALLEL (FIG. 4) | PARALLEL (FIG. 4) | PARALLEL (FIG. 4) | PARALLEL (FIG. 4) | PARALLEL (FIG. 4) | PARALLEL (FIG. 4) |
| GROOVE WIDTH OF NARROW SHALLOW GROOVE (mm) | 0.3 | 0.3 | 0.3 | 0.3 | 0.3 | 0.3 |
| PITCH P OF NARROW SHALLOW GROOVE (mm) | 1.2 | 1.2 | 1.2 | 0.8 | 1.2 | 1.2 |
| POSITION OF RECESSED PORTION | - | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK |
| SHAPE OF RECESSED PORTION | - | QUADRANGULAR | CIRCULAR | CIRCULAR | CIRCULAR | CIRCULAR |
| OPENING AREA Ae OF RECESSED PORTION IN END PORTION REGIONS (mm²) | - | 5.0 | 5.0 | 5.0 | 3.2 | 3.2 |
| OPENING AREA Ac OF RECESSED PORTION IN CENTRAL PORTION REGION (mm²) | - | 2.5 | 2.5 | 2.5 | 1.7 | 1.7 |
| OPENING AREA RATIO Ae/Ac | - | 2.0 | 2.0 | 2.0 | 1.9 | 1.9 |
| DISPOSAL DENSITY DA OF RECESSED PORTION (UNIT/cm²) | - | 0.8 | 0.8 | 0.8 | 0.8 | 2.0 |
| DEPTH RATIO Hd/Hg OF RECESSED PORTION | - | 1.0 | 1.0 | 1.0 | 1.0 | 1.0 |
| BRAKING PERFORMANCE ON ICE | 100 | 110 | 115 | 118 | 125 | 128 |

FIG. 33A

| | EXAMPLE 17 | EXAMPLE 18 | EXAMPLE 19 | EXAMPLE 20 | EXAMPLE 21 | EXAMPLE 22 |
|---|---|---|---|---|---|---|
| SIPE | YES | YES | YES | YES | YES | YES |
| CONFIGURATION OF NARROW SHALLOW GROOVE | PARALLEL (FIG. 4) | PARALLEL (FIG. 4) | PARALLEL (FIG. 4) | PARALLEL (FIG. 4) | PARALLEL (FIG. 4) | PARALLEL (FIG. 4) |
| GROOVE WIDTH OF NARROW SHALLOW GROOVE (mm) | 0.3 | 0.3 | 0.3 | 0.3 | 0.3 | 0.3 |
| PITCH P OF NARROW SHALLOW GROOVE (mm) | 1.2 | 1.2 | 1.2 | 1.2 | 1.2 | 1.2 |
| POSITION OF RECESSED PORTION | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK | CENTRAL PORTION AND END PORTION OF BLOCK |
| SHAPE OF RECESSED PORTION | CIRCULAR | CIRCULAR | CIRCULAR | CIRCULAR | CIRCULAR | CIRCULAR |
| OPENING AREA $A_E$ OF RECESSED PORTION IN END PORTION REGIONS (mm$^2$) | 3.2 | 3.2 | 3.2 | 3.2 | 3.2 | 3.2 |
| OPENING AREA $A_C$ OF RECESSED PORTION IN CENTRAL PORTION REGION (mm$^2$) | 1.7 | 2.0 | 2.5 | 3.0 | 3.0 | 3.0 |
| OPENING AREA RATIO $A_e/A_c$ | 1.9 | 1.6 | 1.3 | 1.1 | 1.1 | 1.1 |
| DISPOSAL DENSITY $D_A$ OF RECESSED PORTION (UNIT/cm$^2$) | 4.0 | 2.0 | 2.0 | 2.0 | 2.0 | 2.0 |
| DEPTH RATIO $H_d/H_g$ OF RECESSED PORTION | 1.0 | 1.0 | 1.0 | 1.0 | 0.5 | 1.5 |
| BRAKING PERFORMANCE ON ICE | 132 | 138 | 132 | 130 | 132 | 128 |

FIG. 33B

PNEUMATIC TIRE

TECHNICAL FIELD

The present technology relates to a pneumatic tire and particularly relates to a pneumatic tire with improved braking performance on ice.

BACKGROUND ART

Typically, a new tire has chemicals adhered to the tread surface. These chemicals reduce the water absorbing function and edge function of the blocks in the early stages of wear, thus reducing the braking performance on ice. Because of this, studless tires in recent years have been provided with a plurality of fine narrow shallow grooves in the surface of the blocks. In such a configuration, the narrow shallow grooves remove a film of water formed between the icy road surface and the tread surface in the early stages of wear, thus improving the braking performance on ice of the tire. An example of a conventional pneumatic tire that is configured in this manner is the technology described in Japanese Patent No. 3702958B.

SUMMARY

The present technology provides a pneumatic tire with improved braking performance on ice.

An embodiment of the present technology is a pneumatic tire comprising in a tread surface thereof a land portion that comprises a rib or a plurality of blocks, the land portion comprising in a contact patch thereof a plurality of narrow shallow grooves and a plurality of recessed portions, and an opening area ratio Se of the recessed portions in end portion regions in a tire lateral direction of one continuous contact patch in the land portion and an opening area ratio Sc of the recessed portions in a central portion region in the tire lateral direction having the relationship Sc<Se, where the central portion region is defined as a region in a central portion in the tire lateral direction occupying 50% of the continuous contact patch, and the end portion regions are defined as regions in left and right end portions in the tire lateral direction occupying 25%.

Another embodiment of the present technology is a pneumatic tire comprising in a tread surface thereof a land portion that comprises a plurality of blocks, the land portion comprising in a contact patch thereof a plurality of narrow shallow grooves and a plurality of recessed portions, and an opening area ratio Se' of the recessed portions in end portion regions in a tire circumferential direction of one continuous contact patch and an opening area ratio Sc' of the recessed portions in a central portion region in the tire circumferential direction having the relationship Sc'<Se', where the central portion region is defined as a region in a central portion in the tire circumferential direction occupying 50% of the continuous contact patch, and the end portion regions are defined as regions in front and back end portions in the tire circumferential direction occupying 25%.

According to a pneumatic tire according to an embodiment of the present technology, the opening area ratio of the recessed portions is greater in the end portion regions in the tire lateral direction or the tire circumferential direction, which improves the water absorbency of the road contact surface at the end portion regions where a film of water is likely to form. Such a configuration is beneficial because the ground contact properties of the end portion regions are improved and braking performance on ice of the tire is improved.

BRIEF DESCRIPTION OF DRAWINGS

FIGS. 32A-32B include a table showing results of performance testing of pneumatic tires according to embodiments of the present technology.

FIGS. 33A-33B include a table showing results of performance testing of pneumatic tires according to embodiments of the present technology.

DETAILED DESCRIPTION

Embodiments of the present technology are described in detail below with reference to the drawings. However, the present technology is not limited to these embodiments. Moreover, constituents of the embodiments include elements that are replaceable while maintaining consistency with of the technology, and obviously replaceable elements. Furthermore, the modified examples described in the embodiments can be combined as desired within the scope apparent to those skilled in the art.

Pneumatic Tire

Figure 1:
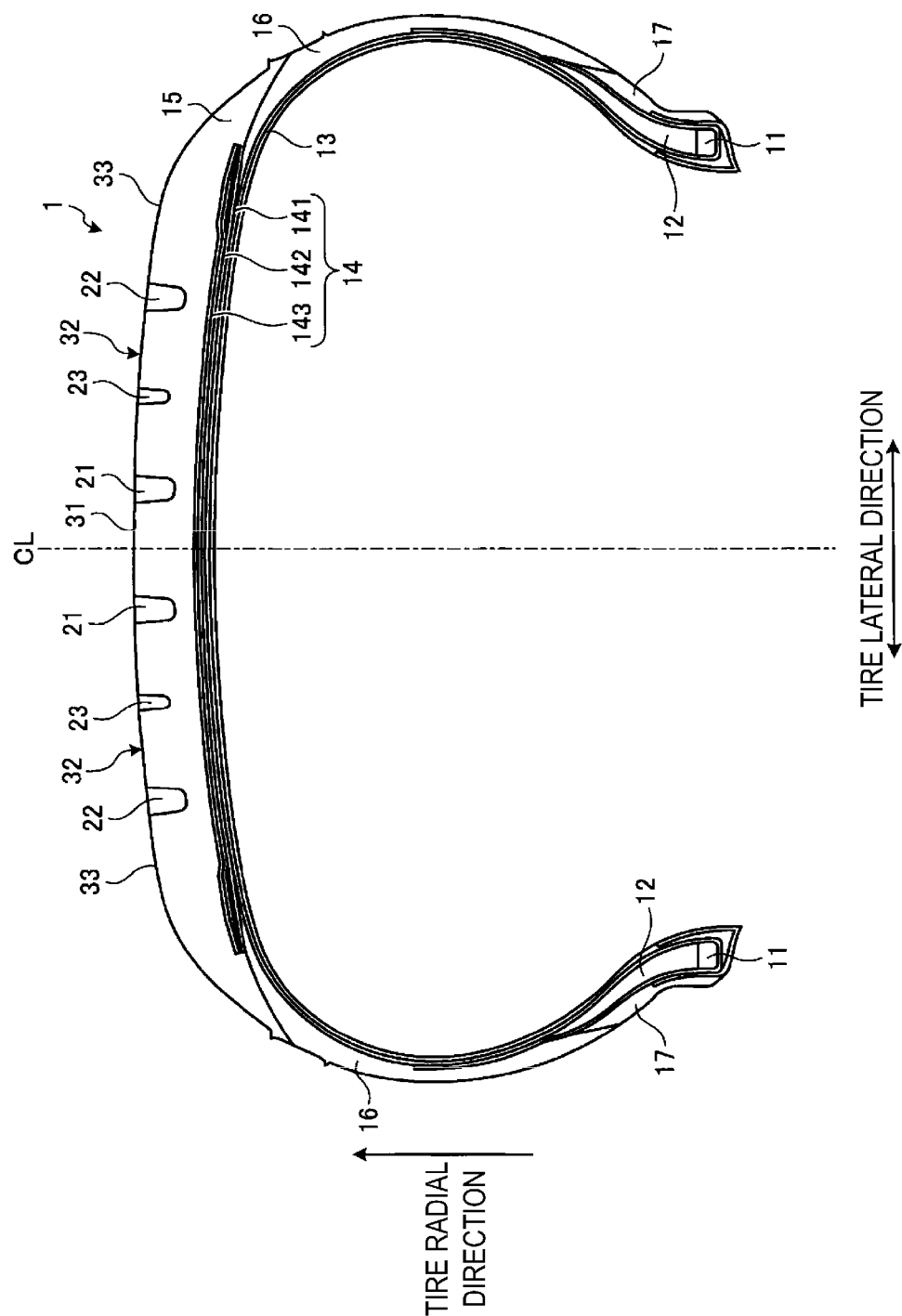
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. The same drawing is a cross-sectional view illustrating a region to one side in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

The pneumatic tire 1 has an annular structure with the tire rotational axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed on peripheries of the pair of bead cores 11, 11 in the tire radial direction and constitute the bead portions.

The carcass layer 13 has a single-layer structure constituted by one carcass ply or a multi-layer structure constituted by layered carcass plies, and stretches between the left and right bead cores 11, 11 in a toroidal form, forming the framework for the tire. Additionally, both end portions of the carcass layer 13 are turned back outwardly in the tire lateral direction so as to wrap around the bead cores 11 and the bead fillers 12 and fixed. The carcass ply(plies) of the carcass layer 13 is constituted by a plurality of carcass cords formed from steel or an organic fiber material (e.g. aramid, nylon, polyester, rayon, or the like) covered by a coating rubber and subjected to a rolling process. The carcass ply(plies) has a carcass angle (inclination angle of the fiber direction of the carcass cords with respect to the tire circumferential direction), as an absolute value, of from 80 degrees to 95 degrees.

The belt layer 14 is formed by layering a pair of cross belts 141, 142 and a belt cover 143 and is disposed around the periphery of the carcass layer 13. The pair of cross belts 141, 142 are constituted by a plurality of belt cords formed from steel or an organic fiber material covered by coating rubber and subjected to a rolling process. The cross belts 141, 142 have a belt angle, as an absolute value, of from 20 degrees to 55 degrees. Furthermore, the pair of cross belts 141, 142 have belt angles (inclination angle of the fiber direction of the belt cords with respect to the tire circumferential direction) of opposite signs, and the belts are layered so that the fiber directions of the belt cords intersect each other (crossply structure). The belt cover 143 is constituted by a plurality of cords formed from steel or an organic fiber material covered by coating rubber and subjected to a rolling process. The belt cover 143 has a belt angle, as an absolute value, of from 0 to 10 degrees. The belt cover 143 is disposed in a layered manner outward of the cross belts 141, 142 in the tire radial direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
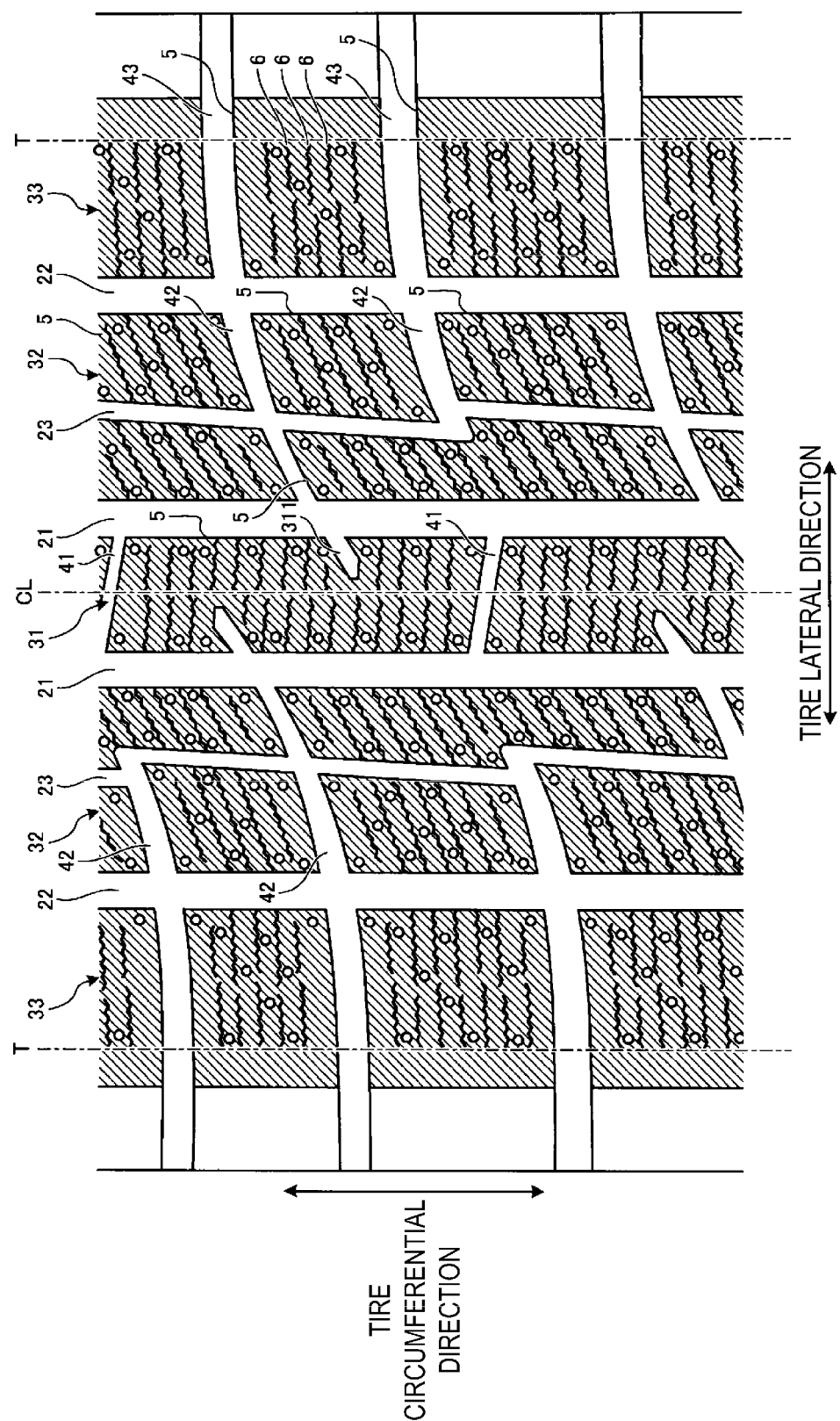
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern of a studless tire. In reference to the same drawing, "tire circumferential direction" refers to the direction revolving about the tire rotational axis. Reference sign T denotes a tire ground contact edge.

As illustrated in FIG. 2, the pneumatic tire 1 is provided with, in the tread portion, a plurality of circumferential main grooves 21, 22 extending in the tire circumferential direction, a plurality of land portions 31 to 33 defined by the circumferential main grooves 21, 22, and a plurality of lug grooves 41 to 43 disposed in the land portions 31 to 33.

"Circumferential main groove" refers to a circumferential groove with a wear indicator that indicates the terminal stage of wear and typically has a groove width of 5.0 mm or greater and a groove depth of 7.5 mm or greater. Moreover, "lug groove" refers to a lateral groove having a groove width of 2.0 mm or greater and a groove depth of 3.0 mm or greater.

The groove width is the maximum distance between the left and right groove walls at the groove opening portion and is measured when the tire is mounted on a specified rim, inflated to the specified internal pressure, and in an unloaded state. In configurations in which the land portions include notched portions or chamfered portions on the edge portions thereof, the groove width is measured with reference to the points where the tread contact patch and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the amplitude of the groove walls.

The groove depth is the maximum distance from the tread contact patch to the groove bottom and is measured when the tire is mounted on a specified rim, inflated to the specified internal pressure, and in an unloaded state. Additionally, in configurations in which the grooves include an uneven portion or sipes on the groove bottom, the groove depth is measured excluding these portions.

"Specified rim" refers to an "applicable rim" as defined by the Japan Automobile Tyre Manufacturers Association Inc. (JATMA), a "Design Rim" as defined by the Tire and Rim Association, Inc. (TRA), or a "Measuring Rim" as defined by the European Tyre and Rim Technical Organisation (ETRTO). Additionally, "specified internal pressure" refers to a "maximum air pressure" as defined by JATMA, to the maximum value in "TIRE LOAD LIMITS AT VARIOUS COLD INFLATION PRESSURES" as defined by TRA, and to "INFLATION PRESSURES" as defined by ETRTO. Additionally, "specified load" refers to a "maximum load capacity" as defined by JATMA, the maximum value in "TIRE LOAD LIMITS AT VARIOUS COLD INFLATION PRESSURES" as defined by TRA, and a "LOAD CAPACITY" as defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, four circumferential main grooves 21, 22 having a straight shape are disposed having left-right symmetry about the tire equatorial plane CL. Additionally, five land portions 31 to 33 are defined by the four circumferential main grooves 21, 22. The land portion 31 is disposed on the tire equatorial plane CL. The land portions 31 to 33 include a plurality of lug grooves 41 to 43 disposed at predetermined pitches in the tire circumferential direction that penetrate the land portions 31 to 33 in the tire lateral direction. The second land portions 32 are each provided with a circumferential narrow groove 23 that extends in the tire circumferential direction while bending. The land portions 31 to 33 are each formed as a row of blocks that are defined by the circumferential main grooves 21, 22, the circumferential narrow grooves 23, and the lug grooves 41 to 43.

Note that in the configuration of FIG. 2, as described above, the circumferential main grooves 21, 22 have a straight shape. However, the present technology is not limited to such a configuration, and the circumferential main grooves 21, 22 may have a zigzag shape or a wave-like shape that bends or curves while extending in the tire circumferential direction (not illustrated).

In the configuration of FIG. 2, as described above, the land portions 31 to 33 are divided in the tire circumferential direction by the lug grooves 41 to 43, forming rows of blocks. However, the present technology is not limited to such a configuration, and, for example, the lug grooves 41 to 43 may have a semi-closed structure in which the lug grooves 41 to 43 terminate within the land portions 31 to 33, thus forming the land portions 31 to 33 as ribs continuous in the tire circumferential direction (not illustrated).

In the configuration of FIG. 2, the pneumatic tire 1 has a tread pattern with left-right symmetry. However, the present technology is not limited to such a configuration, and, for example, the tread pattern may have left-right line symmetry, left-right asymmetry, or directionality in the tire rotation direction (not illustrated).

In the configuration of FIG. 2, the pneumatic tire 1 is provided with the circumferential main grooves 21, 22 that extend in the tire circumferential direction. However, the present technology is not limited to such a configuration, and instead of the circumferential main grooves 21, 22, the pneumatic tire 1 may be provided with a plurality of inclined main grooves that extend while inclining at a predetermined angle with respect to the tire circumferential direction. For example, the pneumatic tire 1 may be provided with a plurality of V-shaped inclined main grooves that have a V-shape projecting in the tire circumferential direction and extend in the tire lateral direction opening to the left and right tread edges, a plurality of lug grooves that connect adjacent V-shaped inclined main grooves, and a plurality of land portions that are defined by the V-shaped inclined main grooves and the lug grooves (not illustrated).

Block Sipes

Figure 3:
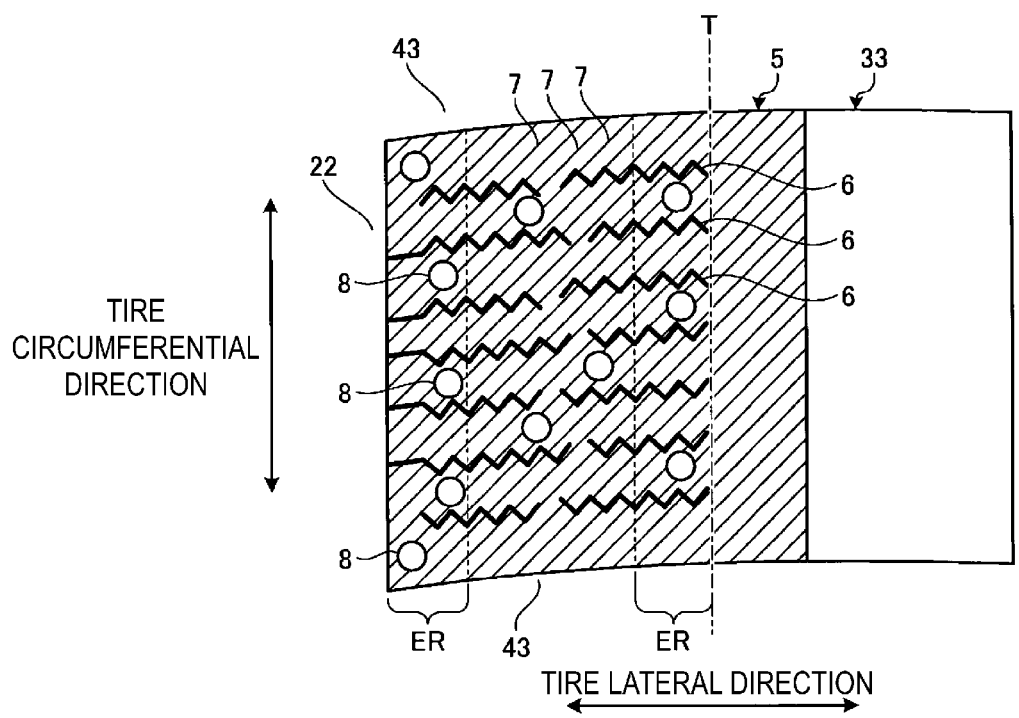
FIG. 3 is an explanatory diagram illustrating a land portion of the pneumatic tire illustrated in FIG. 2.

FIG. 3 is an explanatory diagram illustrating a land portion of the pneumatic tire illustrated in FIG. 2. FIG. 3 is a plan view of one block 5 that composes the shoulder land portion 33.

As illustrated in FIGS. 2 and 3, in the pneumatic tire 1, the blocks 5 of the land portions 31 to 33 include a plurality of sipes 6. By providing the sipes 6, the edge components of the land portions 31 to 33 increase and performance on snow and ice of the tire is improved.

Such a sipe is a cut formed in a land portion that typically has a sipe width of less than 1.0 mm and a sipe depth of 2.0 mm or greater and closes when the tire comes into contact with the ground. Note that the maximum value of the sipe depth is not particularly limited, but is typically less than the groove depth of the main grooves.

The sipe width is the maximum distance of the opening width of the sipe at the contact patch of the land portion and is measured when the tire is mounted on a specified rim, inflated to the specified internal pressure, and in an unloaded state.

Note that the sipes 6 may have a closed structure in which the sipes 6 terminate within the land portions 31 to 33 at both end portions, a semi-closed structure in which the sipes 6 open at the edge portion of the block 5 at one end portion and terminate within the block 5 at the other end portion, or an open structure in which the sipes 6 open at the edge portions of the block 5 at both end portions. Additionally, the length, number, and layout of the sipes 6 in the land portions 31 to 33 can be appropriately selected within the scope apparent to those skilled in the art. The sipes 6 can extend in the tire lateral direction, the tire circumferential direction, or any direction inclined with respect to these directions.

For example, in the configuration of FIG. 3, the shoulder land portion 33 includes the plurality of blocks 5 defined by the outermost circumferential main groove 22 and the plurality of lug grooves 43 (see FIG. 2). The blocks 5 each include a plurality of sipes 6. Additionally, the sipes 6 have a zigzag shape extending in the tire lateral direction, and are disposed side by side at predetermined pitches in the tire circumferential direction. Additionally, the outermost sipes 6 in the tire circumferential direction has a closed structure in which the sipes 6 terminate within the block 5 at both end portions. As a result, the rigidity of the edge portions of the leading edge and the trailing edge of the block 5 when the tire is rolling is ensured. The sipes 6 in the central portion in the tire circumferential direction have a semi-closed structure in which the sipes 6 open to the circumferential main groove 22 at one end portion and terminate within the block 5 at the other end portion. As a result, the rigidity of the block 5 in the central portion decreases, and the stiffness distribution of the blocks in the tire circumferential direction is made uniform.

Block Narrow Shallow Groove

Figure 4:
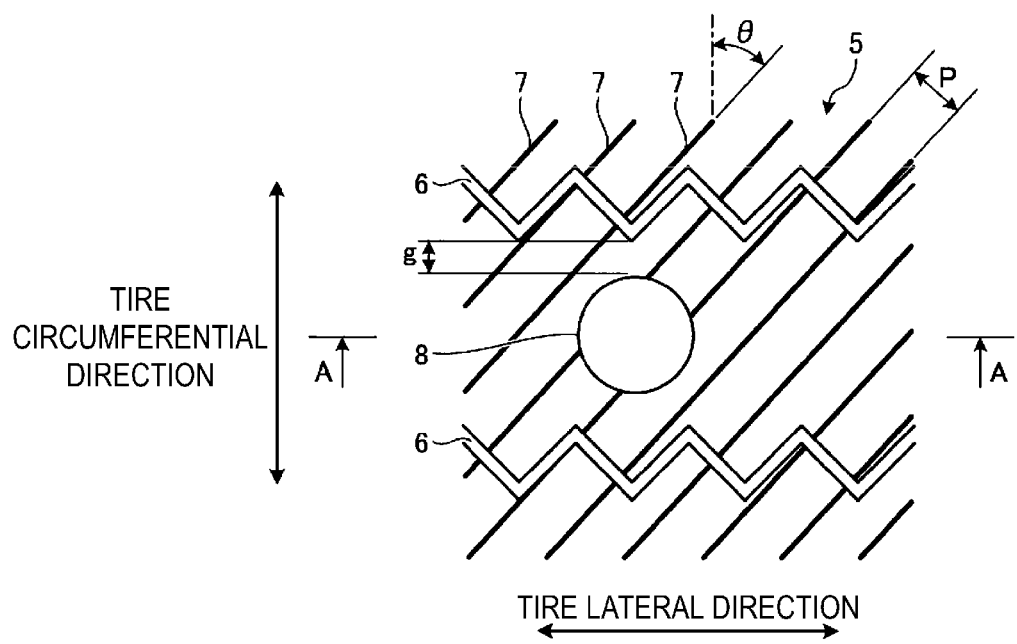
FIG. 4 is an enlarged view illustrating a main portion of a block illustrated in FIG. 3.
Figure 5:
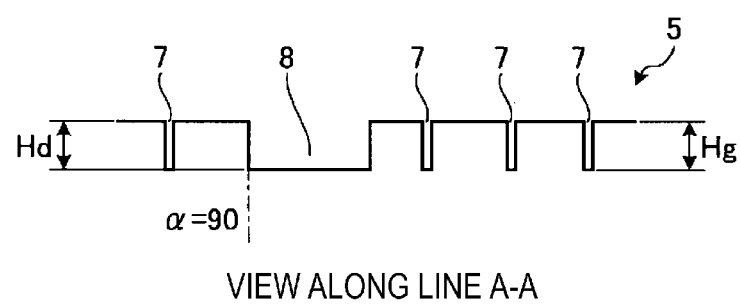
FIG. 5 is a cross-sectional view of a contact patch of the block illustrated in FIG. 4 taken along line A-A.

FIG. 4 is an enlarged view illustrating a main portion of the block illustrated in FIG. 3. FIG. 5 is a cross-sectional view of the contact patch of the block illustrated in FIG. 4 taken along line A-A. FIG. 4 illustrates the positional relationship between the sipes 6, narrow shallow grooves 7, and a recessed portion 8. FIG. 5 is a cross-sectional view in the depth direction of the narrow shallow grooves 7 and the recessed portion 8.

In the pneumatic tire 1, the land portions 31 to 33 include a plurality of narrow shallow grooves 7 in the contact patch (see FIG. 3). In such a configuration, by the narrow shallow grooves 7 taking in and removing a film of water formed between an icy road surface and the tread surface when the tire comes into contact with the ground, the braking performance on ice of the tire is improved.

The narrow shallow grooves 7 have a groove width of from 0.2 mm to 0.7 mm and a groove depth Hg of from 0.2 mm to 0.7 mm (see FIG. 5). Thus, the narrow shallow grooves 7 are shallower than the sipes 6. Additionally, the narrow shallow grooves 7 are disposed across the entire surface of the land portions 31 to 33.

For example, in the configuration of FIG. 3, the narrow shallow grooves 7 are disposed in the entire region of the contact patch of the shoulder land portion 33. The narrow shallow grooves 7 have a linear shape and are disposed at an incline of a predetermined inclination angle θ with respect to the tire circumferential direction (see FIG. 4). The narrow shallow grooves 7 are disposed side by side at predetermined pitches P (see FIG. 4). As illustrated in FIG. 4, the narrow shallow grooves 7 intersect the sipes 6 and are divided by the sipes 6 in the longitudinal direction.

Note that as illustrated in FIG. 3, in a configuration in which the narrow shallow grooves 7 are elongated and disposed side by side, a film of water absorbed by the narrow shallow grooves 7 is guided through the narrow shallow grooves 7 in the longitudinal direction and discharged. In such a configuration, the inclination angle θ of the narrow shallow grooves 7 (see FIG. 4) is preferably in the range 20 degrees≤θ≤80 degrees, and more preferably in the range 40 degrees≤θ≤60 degrees. The disposal pitch P (see FIG. 4) of the narrow shallow grooves 7 is preferably in the range 0.5 mm≤P≤1.5 mm, and more preferably in the range 0.7 mm≤P≤1.2 mm. As a result, the film of water removing function of the narrow shallow grooves 7 is appropriately ensured, and the ground contact area of the land portions 31 to 33 is ensured. Note that the disposal density of the narrow shallow grooves 7 is not particularly limited but is constrained by the disposal pitch P described above.

The disposal pitch P of the narrow shallow grooves 7 is defined as the distance between the groove center lines of adjacent narrow shallow grooves 7, 7.

Block Recessed Portions

As illustrated in FIGS. 2 and 3, in the pneumatic tire 1, the land portions 31 to 33 each include a plurality of recessed portions 8 in the contact patch. In such a configuration, by the recessed portions 8 taking in a film of water formed between the icy road surface and the tread surface when the tire contacts the ground and the edge components of the land portions 31 to 33 being increased by providing the recessed portions 8, the braking performance on ice of the tire is improved.

Each of the recessed portions 8 is a closed recess (recess, or dimple, that does not open to the boundary of the contact patch) formed in the contact patch of the land portions 31 to 33. The recessed portion 8 has a discretionary geometrical shape at the contact patch of the land portions 31 to 33. For example, the shape of the recessed portion 8 may be circular, elliptical, quadrangular, or another polygonal shape. A circular or elliptical recessed portion 8 is preferable to reduce the uneven wear of the contact patch of the land portions 31 to 33, and a polygonal recessed portion 8 is preferable to improve the braking performance on ice via the increased edge components.

Additionally, the opening area of the recessed portion 8 preferably ranges from 2.5 mm² to 10 mm². For example, a circular recessed portion 8 has a diameter ranging from approximately 1.8 mm to 3.6 mm. As a result, the film of water removal performance of the recessed portion 8 is ensured.

The opening area of the recessed portion 8 is the opening area of the recessed portion 8 at the contact patch of the land portions 31 to 33 and is measured when the tire is mounted on a specified rim, inflated to the specified internal pressure, and in an unloaded state.

Additionally, the depth Hd (see FIG. 5) of the recessed portion 8 and the groove depth Hg of the narrow shallow groove 7 preferably have the relationship 0.5≤Hd/Hg≤1.5, and more preferably have the relationship 0.8≤Hd/Hg≤1.2. In other words, the depth Hd of the recessed portion 8 is approximately equal to the groove depth Hg of the narrow shallow groove 7. As a result, the water absorbing function of the contact patch of the land portions 31 to 33 is improved. Additionally, by the recessed portion 8 being shallow compared to the sipes (for example a linear sipe 6 or a circular sipe (not illustrated)) the rigidity of the land portions 31 to 33 is appropriate ensured. Thus, the braking performance on ice of the tire is ensured.

Additionally, a wall angle α (see FIG. 5) of the recessed portion 8 is preferably in the range −85 degrees≤α≤95 degrees. In other words, the inner wall of the recessed portion 8 is preferably substantially vertical relative to the contact patch of the land portions 31 to 33. As a result, the edge components of the recessed portion 8 are increased.

The wall angle α of the recessed portion 8 is the angle formed by the contact patch of the land portions 31 to 33 and the inner wall of the recessed portion 8 when viewed in a depth direction cross-section of the recessed portion 8.

Additionally, as illustrated in FIG. 4, the recessed portion 8 is disposed spaced apart from the sipes 6. In other words, the recessed portions 8 and the sipes 6 are disposed at different positions in the contact patch of the land portions 31 to 33 and do not meet. The distance g between the recessed portion 8 and the sipes 6 is preferably in the range 0.2 mm≤g, and more preferably in the range 0.3 mm≤g. As a result, the rigidity of the land portions 31 to 33 is appropriately ensured.

Additionally, as illustrated in FIG. 4, the recessed portion 8 is disposed intersecting and communicating with the narrow shallow grooves 7. The recessed portion 8 is disposed across separate adjacent narrow shallow grooves 7, 7. In other words, separate adjacent narrow shallow grooves 7, 7 are disposed penetrating through one recessed portion 8. As a result, the adjacent narrow shallow grooves 7, 7 communicate with each other through the recessed portion 8. Additionally, the recessed portion 8 is disposed between the adjacent narrow shallow grooves 7, 7 and partially expands the volume of the narrow shallow grooves 7. Thus, when the tire comes into contact with the ground, water is retained in the recessed portion 8, and a film of water on the road contact surface is efficiently absorbed. As a result, the braking performance on ice of the tire is improved.

"Separate narrow shallow grooves 7" refers to a plurality of narrow shallow grooves 7 that extend without meeting in a pattern of arrangement in which only the narrow shallow grooves 7 are present, excluding the sipes 6 and the recessed portions 8. Accordingly, no embodiments of the present technology have a pattern of arrangement in which the plurality of narrow shallow grooves 7 meet each other.

For example, in the configuration of FIG. 3, the narrow shallow grooves 7 having a linear shape are disposed in the entire surface of the land portion 33 at predetermined pitches while inclining at a predetermined angle with respect to the tire circumferential direction. As a result, as illustrated in FIG. 4, the adjacent narrow shallow grooves 7, 7 run side by side in the same direction. Additionally, the recessed portion 8 is disposed across two adjacent narrow shallow grooves 7, 7 to allow the two adjacent shallow grooves 7, 7 to communicate with each other. In other words, the two narrow shallow grooves 7, 7 running side by side penetrate through one recessed portion 8. Note that, the present technology is not limited to the configuration described above, and three or more narrow shallow grooves 7 may penetrate through one recessed portion 8 (not illustrated).

Additionally, in the configuration described above, the number of recessed portions 8 disposed across the adjacent narrow shallow grooves 7, 7 in the contact patch of one block 5 is preferably 70% or greater of the total number of recessed portions 8 in the contact patch, and more preferably 80% or greater. As a result, the recessed portions 8 can function effectively to retain water as described above. For example, in the configuration of FIG. 3, all of the recessed portions 8 are disposed across two adjacent narrow shallow grooves 7, 7. However, the present technology is not limited to such a configuration, and one or more of the recessed portions 8 may intersect with a single narrow shallow groove 7 or be disposed between adjacent narrow shallow grooves 7, 7 without intersecting a narrow shallow groove 7 (not illustrated).

Additionally, in the configuration of FIG. 3, the land portion 33 is provided with the plurality of sipes 6 that define the narrow shallow grooves 7 in the contact patch. Each section of the narrow shallow grooves 7 defined by the sipes 6 extends without penetrating through a plurality of recessed portions 8. In other words, the recessed portions 8 are disposed in a dispersed manner so that two or more recessed portions 8 are not disposed in the same section of the narrow shallow grooves 7 defined by the sipes 6. Accordingly, in each section of the narrow shallow grooves 7, a maximum of one recessed portion 8 is disposed.

Additionally, as illustrated in FIG. 3, the recessed portions 8 are more thinly dispersed than the narrow shallow grooves 7. Specifically, the disposal density Da of the recessed portions 8 in the entire region of the contact patch of one rib or block is preferably in the range $0.8 \text{ unit/cm}^2 \leq Da \leq 4.0 \text{ unit/cm}^2$ and more preferably in the range $1.0 \text{ unit/cm}^2 \leq Da \leq 3.0 \text{ unit/cm}^2$. As a result, the area of the contact patch of the land portions 31 to 33 is ensured.

The disposal density Da of the recessed portions 8 is defined as the total number of recessed portions 8 with respect to the area of the contact patch of one rib or block. For example, in a configuration in which the land portions are ribs continuous in the tire circumferential direction (not illustrated), the total number of recessed portion 8 with respect to the contact patch area of one entire rib is defined as the disposal density Da. Alternatively, in a configuration in which the land portions are blocks (see FIGS. 2 and 3), the total number of recessed portions 8 with respect to the contact patch area of one block 5 is defined as the disposal density Da.

The contact patch area is measured at a contact surface between a tire and a flat plate when the tire is mounted on a specified rim, inflated to the specified internal pressure, placed vertically on the flat plate in a static state, and loaded with a load corresponding to the specified load.

Recessed Portion Opening Area Ratio

In the pneumatic tire 1, the opening area ratio Se of the recessed portions 8 in the end portion regions ER (see FIG. 3) in the tire lateral direction defined at the continuous contact patch and the opening area ratio Sc of the recessed portions 8 in the central portion region in the tire lateral direction have the relationship Sc<Se. In other words, the opening area ratio Se of the recessed portions 8 in the end portion regions ER (see FIG. 3) is greater than that of the central portion region. Additionally, the opening area ratios Se, Sc of the recessed portions 8 preferably have the relationship 1.50≤Se/Sc, and more preferably have the relationship 3.00≤Se/Sc. The maximum value of the ratio Se/Sc is not particularly limited but is constrained by its relationship with, for example, the disposal density and opening area of the recessed portions 8. In a configuration in which all of the recessed portions 8 are disposed in the end portion regions ER (see, for example, the configuration of FIG. 7 described below), Sc is equal to zero, thus satisfying the condition Sc<Se.

The contact patch of the land portions is defined at a contact surface between a tire and a flat plate when the tire is mounted on a specified rim, inflated to the specified internal pressure, placed vertically on the flat plate in a static state, and loaded with a load corresponding to the specified load.

A continuous contact patch is defined as a contact patch defined by grooves having a groove width of 2.0 mm or greater and a groove depth of 3.0 mm or greater. Specifically, a contact patch of one rib or one block defined by lug grooves and circumferential grooves having the groove width and groove depth described above corresponds to the continuous contact patch described above. Additionally, for example, closed lug grooves which terminate within the land portions, notches partially formed in the land portions (for example, notched portion 311 of FIG. 7 described below), and sipes and kerfs that close when the tire comes into contact with the ground do not divide the contact patch of the land portions, and thus do not correspond to the grooves described above.

The central portion region in the tire lateral direction is defined as the region in the central portion occupying 50% of the continuous contact patch in the tire lateral direction (see FIG. 3). The end portion region in the tire lateral direction is defined as the region of the left and right end portions each occupying 25% of the continuous contact patch in the tire lateral direction. For example, in a configuration in which the land portions are ribs continuous in the tire circumferential direction (not illustrated), the contact patch of one entire rib is divided into the central portion region and the end portion regions in the tire lateral direction. Alternatively, in a configuration in which the land portions are rows of blocks (see FIG. 2), the contact patch of each block that composes the row of blocks is divided into a central portion region and end portion regions. Note that the dashed lines of FIG. 3 indicate the boundary lines between the central portion region and the end portion regions.

The opening area ratio of the recessed portions is defined as the ratio between the sum of the opening areas of the recessed portions disposed in a predetermined region and the contact patch area of the same region. In a configuration in which a recessed portion and a boundary line of a region intersect, the recessed portion is considered to be disposed in the region if its center point is within the region.

The opening area of the recessed portions and the contact patch area of the region are measured at a contact surface between a tire and a flat plate when the tire is mounted on a specified rim, inflated to the specified internal pressure, placed vertically on the flat plate in a static state, and loaded with a load corresponding to the specified load.

Additionally, in a configuration in which the land portions are formed by a plurality of blocks arranged in the tire circumferential direction (see FIG. 2), 70% or more, and preferably 80% or more of the blocks 5 that compose one row of blocks preferably satisfy the condition Sc<Se for the opening area ratio of the recessed portions 8 described above. In the entire tread, it is only required that at least one land portion satisfy the conditions for the row of blocks described above.

The opening area ratio of the recessed portions 8 in the central portion region and the end portion regions can be adjusted depending on the disposal density of the recessed portions 8 in each region. In other words, by disposing the recessed portions 8 densely in the end portion regions ER in the tire lateral direction and sparsely in the central portion region in the tire lateral direction, the opening area ratio Se of the recessed portions 8 in the end portion regions ER is made greater.

Specifically, in reference to FIG. 3, by the disposal number Ne of recessed portions 8 in the end portion regions ER in the tire lateral direction in one block 5 and the disposal number Nc of the recessed portions 8 in the central portion region (reference sign omitted in the drawings) in the tire lateral direction having the relationship Nc<Ne, the condition Sc<Se for the opening area ratio of the recessed portions 8 is satisfied. In other words, the recessed portions 8 are disposed unevenly in the contact patch of the one rib or one block so that the disposal density of the recessed portions 8 in one rib or one block differs between the end portion regions ER and the central portion region in the tire lateral direction. Additionally, the disposal numbers Ne, Nc of the recessed portions 8 preferably have the relationship $1.50 \leq Ne/Nc$, and more preferably the relationship $3.00 \leq Ne/Nc$. The maximum value of the ratio Ne/Nc is not particularly limited but is constrained by its relationship with the disposal density of the recessed portions 8. In a configuration in which all of the recessed portions 8 are disposed in the end portion regions ER (see, for example, the configuration of FIG. 7 described below), Nc is equal to zero, thus satisfying the conditions Sc<Se and Nc<Ne.

The disposal number of recessed portions is the number of recessed portions with their center points in the predetermined region. Accordingly, recessed portions that partially protrude from the region are still considered to be disposed in the region if their center points are within the region.

Additionally, in a configuration in which the land portions are formed by a plurality of blocks arranged in the tire circumferential direction (see FIG. 2), 70% or more, and preferably 80% or more of the blocks 5 that compose one row of blocks preferably satisfy the condition Nc<Ne for the disposal number of the recessed portions 8 described above. In the entire tread, it is only required that at least one land portion satisfy the conditions for the row of blocks.

Note that as described above, because the central portion region of the block 5 is defined as the region of the central portion occupying 50% of the contact patch of the block 5, in one block 5, the contact patch area of the central portion region and the contact patch area of the end portion regions are essentially equal excluding any notched portions and narrow grooves. As a result, in a configuration in which each recessed portion 8 of the block 5 has the same opening area, because of the condition Nc<Ne of the disposal numbers of the recessed portions 8 described above, the sum of the opening areas of the recessed portions 8 in the end portion regions is greater than the sum of the opening areas of the recessed portions 8 in the central portion region.

In the configuration described above, the recessed portions 8 are disposed densely in the end portion regions ER of the blocks 5 where a film of water is likely to form. Thus, a film of water on the road contact surface is efficiently absorbed due to the water absorbing function provided by the recessed portions 8. As a result, the adhesive properties of the block road contact surface to an icy road surface is improved, and the braking performance on ice of the tire is improved. Additionally, by disposing the recessed portions 8 sparsely in the central portion region, the contact patch area of the central portion region of the block 5 is ensured and the braking performance on ice of the tire is improved.

In particular, the shoulder land portions 33 (defined as the laterally outer land portions defined by the outermost circumferential main grooves) have a great effect on braking performance of the tire. Thus, as illustrated in FIG. 3, by the recessed portions 8 being densely disposed in the end portion regions ER in the tire lateral direction of the block 5 of the shoulder land portion 33, the function of the recessed portions 8 to improve braking performance on ice is significantly obtained.

For example, in the configuration of FIG. 3, one block 5 of the shoulder land portion 33 includes a total of eleven recessed portions 8 in the contact patch. Specifically, a total of eight recessed portions 8 are disposed in the left and right end portion regions ER, ER in the tire lateral direction of the contact patch and a total of three recessed portions 8 are disposed in the central portion region. Additionally, the recessed portions 8 have the same opening shape and the same opening area. The disposal number Ne of the recessed portions 8 in the end portion regions ER in the tire lateral direction and the disposal number Nc of the recessed portions 8 in the central portion region in the tire lateral direction have the relationship Ne/Nc=8/3=2.67. Additionally, all of the recessed portions 8 of the blocks 5 in the entire shoulder land portion 33 satisfy the condition for the disposal number Ne described above (see FIG. 2).

In the configuration of FIG. 3, the blocks 5 of the shoulder land portion 33 include a rectangular contact patch. The sipes 6 are disposed side by side in the tire circumferential direction and divide the blocks 5 into a plurality of sections in the tire circumferential direction. Each section includes at least one recessed portion 8. In the section in the central portion of the block 5 in the tire circumferential direction, the section including the recessed portion 8 in the end portion of the block 5 proximal to the circumferential main groove 22 and the section without a recessed portion 8 in this end portion are disposed in an alternating arrangement in the tire circumferential direction. In the sections in both end portions of the block 5 in the tire circumferential direction, the recessed portions 8 are disposed in the corner portions of the block 5 proximal to the circumferential main groove 22. In the sections in both end portions of the block 5 in the tire circumferential direction, the recessed portions 8 are disposed only in the corner portions and are not disposed in the central portion region in the tire lateral direction.

Corner portions of the land portions 31 to 33 are defined as the regions 5 mm square including the corner portion of the contact patch of the land portion. The corner portion of the land portion is not just the portion of the land portion defined by the main groove and the lug groove, but also includes the portion of the land portion defined by a notched portion (for example, a notched portion 311 of FIG. 7 described below) formed in the land portion. Additionally, the recessed portion 8 is considered to be disposed in the corner portion described above if the center of the recessed portion 8 is in the corner portion.

In the configuration of FIG. 3, three discretionary adjacent sections in the tire circumferential direction include a section including a recessed portion 8 in the end portion regions ER in the tire lateral direction and a section including a recessed portion 8 in the central portion region in the tire lateral direction. As a result, the recessed portions 8 are disposed dispersedly throughout the end portion regions ER and the central portion regions of the land portions 31 to 33.

"Sections in both end portions of the block 5 in the tire circumferential direction" refer to a pair of sections located at both end portions in the tire circumferential direction of the sections of the block 5 defined by the sipes 6 in the tire circumferential direction. "Section in the central portion of the block 5 in the tire circumferential direction" refers to the section excluding the sections in both end portions in the tire circumferential direction.

When the tire comes into contact with the ground, ground contact pressure acts upon the end portion region ER of the block 5 in the tire lateral direction, in particular the end portion region ER proximal to the circumferential main groove 22 and the corner portions, more than the central portion of the block 5. As a result, during travel on icy road surfaces, the ice on the road surface is readily melted by the ground contact pressure and forms a film of water. Accordingly, by disposing the recessed portions 8 in the end portion region ER and the corner portions of the blocks 5, the film of water on the road contact surface is efficiently absorbed, and the braking performance on ice of the tire is improved.

Additionally, in the configuration of FIG. 3, the sipes 6 are disposed parallel with or at a slight incline to the lug grooves 43. The sipes 6 are also disposed only in the region inward from the tire ground contact edge T in the tire lateral direction. The narrow shallow grooves 7 extend beyond the tire ground contact edge T to the outer region of the land portion 33 in the tire lateral direction. The recessed portions 8 are disposed only in the region inward from the tire ground contact edge T in the tire lateral direction.

"Tire ground contact edge T" refers to the maximum width position in the tire axial direction of the contact surface between the tire and a flat plate and is measured when the tire is mounted on a specified rim, inflated to the specified internal pressure, placed vertically on the flat plate in a static state, and loaded with a load corresponding to the specified load.

Figure 6:
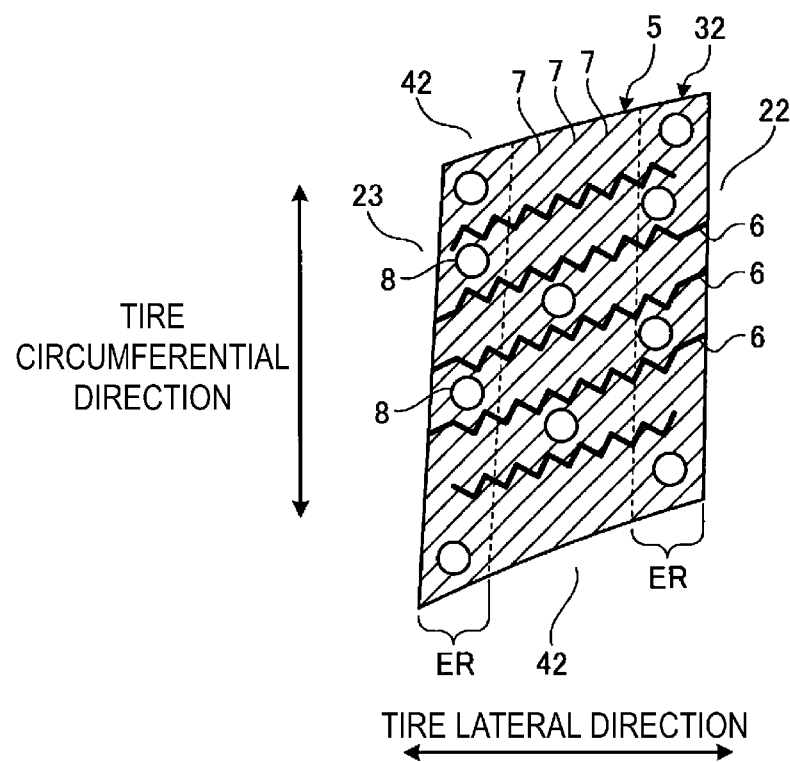
FIG. 6 is an explanatory diagram illustrating a land portion of the pneumatic tire illustrated in FIG. 2.
Figure 7:
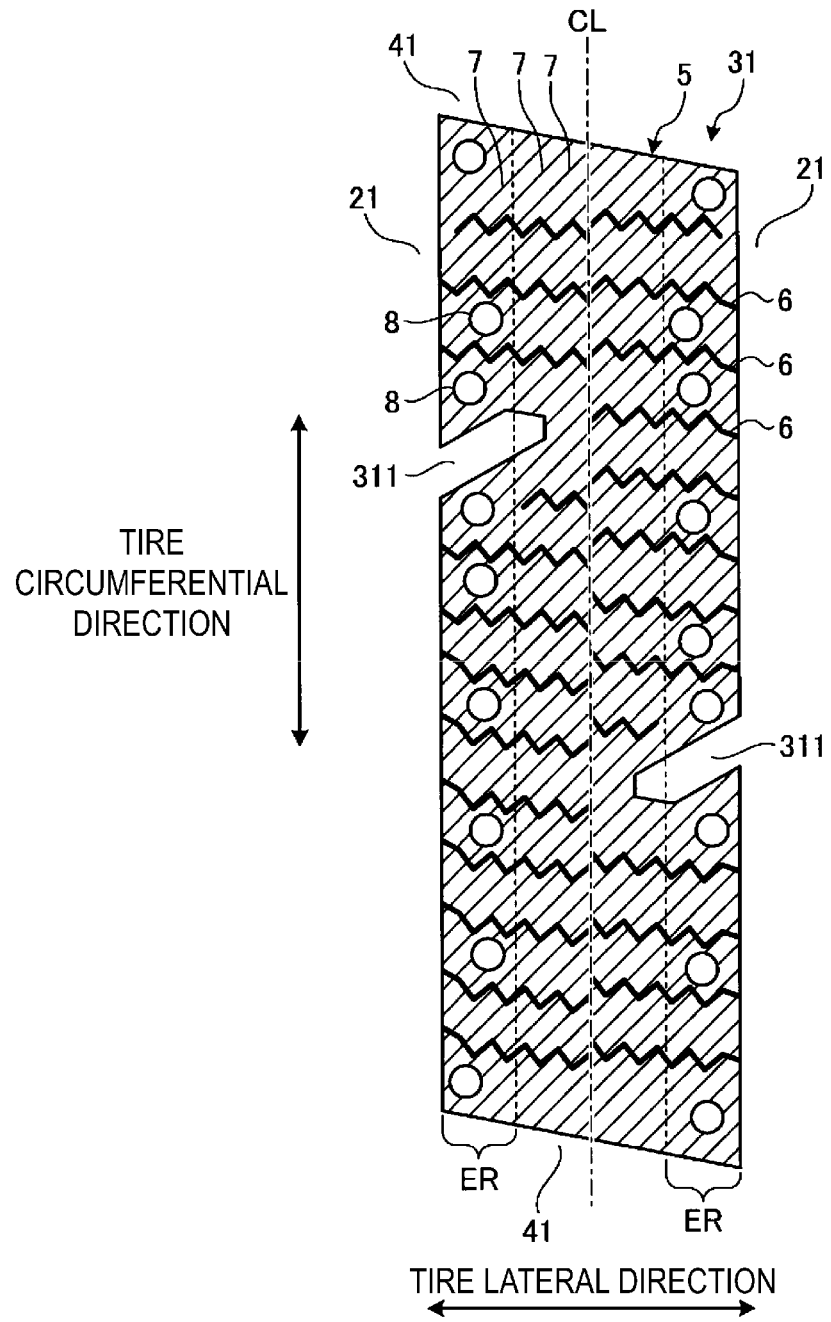
FIG. 7 is an explanatory diagram illustrating a land portion of the pneumatic tire illustrated in FIG. 2.

FIGS. 6 and 7 are explanatory diagrams illustrating the land portions of the pneumatic tire illustrated in FIG. 2. FIG. 6 is a plan view of one of the blocks 5 that compose the second land portion 32. FIG. 7 is a plan view of one of the blocks 5 that compose the center land portion 31.

In the configuration of FIG. 2, the second land portions 32 are each divided in the tire lateral direction by one circumferential narrow groove 23 and further divided in the tire circumferential direction by a plurality of lug grooves 42, which forms a plurality of blocks 5. Additionally, in the inner region of each of the second land portions 32 in the tire lateral direction, blocks 5 longer in the tire circumferential direction are formed, and in the outer region in the tire lateral direction, shorter blocks 5 are formed. Note that the second land portion 32 is defined as an inner land portion in the tire lateral direction defined by the outermost circumferential main groove 22.

Additionally, as illustrated in FIG. 6, one block 5 of the second land portion 32 located outward in the tire lateral direction includes a rectangular contact patch. The sipes 6 are disposed side by side in the tire circumferential direction to divide the block 5 into a plurality of sections. Each section includes at least one recessed portion 8. Additionally, sections in the central portion of the block 5 in the tire circumferential direction (the sections excluding the sections in both end portions in the tire circumferential direction) have an arrangement in which sections including the recessed portions 8 only in the end portion regions ER of the block 5 in the tire lateral direction and the sections including the recessed portions 8 only in the central portion region in the tire lateral direction are disposed alternately in the tire circumferential direction. In the sections in both end portions of the block 5 in the tire circumferential direction, the recessed portions 8 are disposed in the four corner portions of the block 5 and are not disposed in the central portion region in the tire lateral direction.

Additionally, one block 5 includes a total of ten recessed portions 8 in the contact patch. Specifically, a total of eight recessed portions 8 are disposed in the left and right end portion regions ER in the tire lateral direction and two recessed portions 8 are disposed in the central portion region in the tire lateral direction. Additionally, the recessed portions 8 have the same opening shape and the same opening area. The disposal number Ne of the recessed portions 8 in the end portion regions ER of the block 5 in the tire lateral direction and the disposal number Nc of the recessed portions 8 in the central portion region (reference sign omitted in the drawings) in the tire lateral direction have the relationship Ne/Nc=8/2=4.00. Additionally, in the second land portion 32, the recessed portions 8 in all of the blocks 5 satisfy the condition Nc<Ne described above (see FIG. 2).

Typically, in the land portion 32 including the shorter blocks 5, the rigidity of the blocks 5 is reduced, thus when the vehicle brakes, the amount the blocks 5 collapse is great. In particular, in a configuration in which the blocks 5 include a plurality of sipes 6, this tendency is significant and the braking performance on ice of the tire is susceptible to being decreased. However, in such a configuration, by the blocks 5 being provided with the recessed portions 8 in all of the sections of the block 5 defined by the sipes 6, a film of water on the road contact surface is efficiently absorbed, and the braking performance on ice of the tire is ensured.

In particular, the second land portions 32 have a great effect on the driving/braking performance of the tire. Thus, as illustrated in FIG. 6, by the recessed portions 8 being densely disposed in the end portion regions ER in the tire lateral direction of the block 5 of the second land portion 32, a film of water can be efficiently absorbed at the end portion regions ER where a film of water is likely to form, and the function of the recessed portions 8 to improve braking performance on ice is significantly obtained.

In the configuration of FIG. 2, the center land portion 31 is divided in the tire circumferential direction by a plurality of lug grooves 41 into a plurality of blocks 5. Additionally, the blocks 5 include notched portions 311 on extension lines of the lug grooves 42 of the second land portion 32. The blocks 5 include a rectangular contact patch. Note that the center land portion is defined as the land portion 31 on the tire equatorial plane CL (see FIG. 2) or adjacent land portions on either side of the tire equatorial plane CL (not illustrated).

Additionally, as illustrated in FIG. 7, the sipes 6 are disposed side by side in the tire circumferential direction to divide the block 5 into a plurality of sections. The block 5 includes sections without a recessed portion 8. Three discretionary adjacent sections include a section without a recessed portion 8. For example, in the configuration of FIG. 7, the section including the recessed portion 8 in only both end portions of the block 5 in the tire lateral direction and the section without a recessed portion 8 are disposed in an alternating arrangement in the tire circumferential direction. Additionally, the recessed portions 8 are disposed in the four corner portions of the block 5. In the sections in both end portions of the block 5 in the tire circumferential direction, the recessed portions 8 are disposed only in the corner portions of the block 5 and are not disposed in the central portion region in the tire lateral direction. Additionally, the section including the notched portion 311 includes the recessed portion 8 in close proximity to the notched portion 311.

The disposal number Ne of the recessed portions 8 in the end portion regions ER of the block 5 in the tire lateral direction is 18, and the disposal number Nc of the recessed portions 8 in the central portion region in the tire lateral direction is zero. Additionally, the recessed portions 8 have the same opening shape and the same opening area. Additionally, in the center land portion 31, the recessed portions 8 in all of the blocks 5 satisfy the condition Nc<Ne described above (see FIG. 2).

Typically, the center land portion 31 preferably has high rigidity to ensure the steering stability performance of the tire. Thus, as illustrated in FIG. 7, by the blocks 5 of the center land portion 31 being partially provided with sections without a recessed portion 8, the rigidity of the blocks 5 is ensured, and the steering stability performance of the tire is ensured.

Additionally, the center land portion 31 has a great effect on the driving performance of the tire. Thus, as illustrated in FIG. 7, by the recessed portions 8 being densely disposed in the end portion regions ER in the tire lateral direction of the block 5 of the center land portion 31, the edge components are increased, and driving performance is improved.

Note that in the configuration described above, at least one recessed portion 8 is preferably disposed in a position that corresponds to a vent hole of the tire mold (not illustrated). In other words, in the vulcanization molding of the tire, because the green tire is pressed against the tire mold, the air in the tire mold needs to be discharged outside. Accordingly, the tire mold includes a plurality of vent devices (not illustrated) in the mold surface for forming the contact patch of the land portions 31 to 33. Additionally, one type of vent device forms a vent hole (small recess) in the mold surface corresponding to the post-vulcanization land portions 31 to 33. Thus, by using the vent hole as a recessed portion 8, the vent hole is effectively utilized, and the number of unnecessary recesses are reduced in the contact patch of the land portions 31 to 33 allowing the contact patch area of the land portions 31 to 33 to be appropriately ensured.

First Modified Example

FIGS. 8 to 14 are explanatory diagrams illustrating modified examples of the pneumatic tire illustrated in FIG. 4. These drawings illustrate the positional relationship between the sipes 6, the narrow shallow grooves 7, and the recessed portion 8.

In the configuration of FIG. 4, the narrow shallow grooves 7 are disposed at an incline of a predetermined angle θ with respect to the tire circumferential direction. Such a configuration is preferable because the inclined narrow shallow grooves 7 provide edge components in both the tire circumferential direction and the tire lateral direction.

Figure 8:
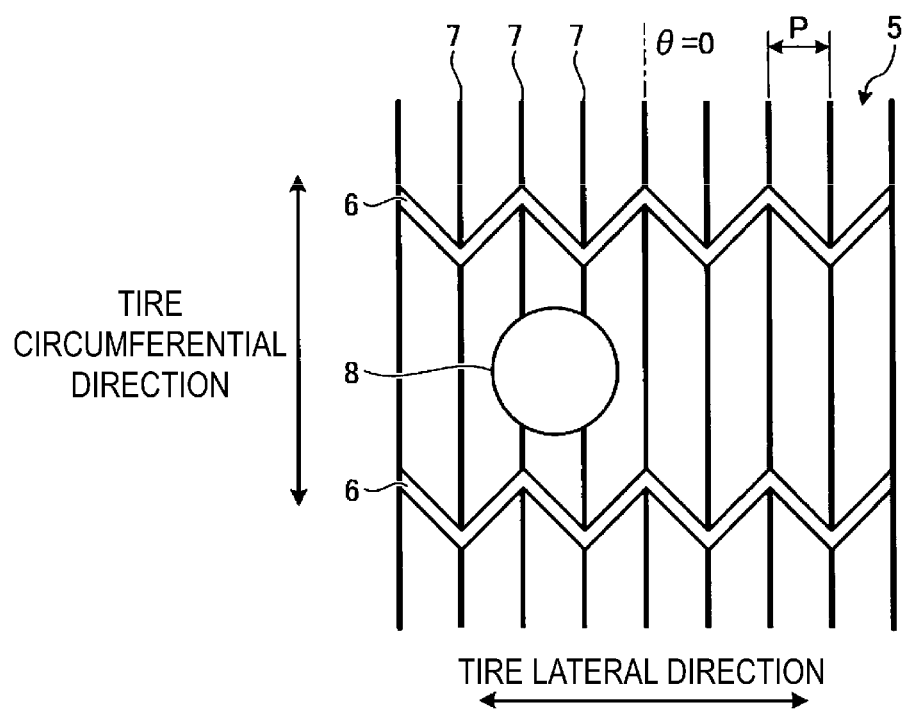
FIG. 8 is an explanatory diagram illustrating a modified example of the pneumatic tire illustrated in FIG. 4.
Figure 9:
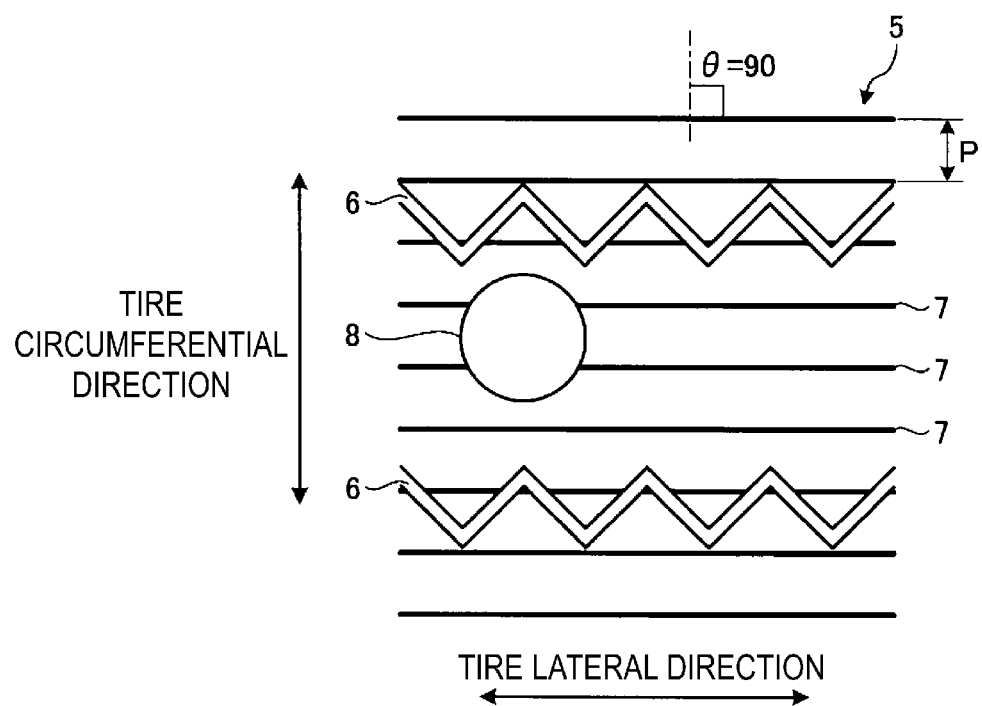
FIG. 9 is an explanatory diagram illustrating a modified example of the pneumatic tire illustrated in FIG. 4.

However, the present technology is not limited to such a configuration, and the narrow shallow grooves 7 may extend parallel with the tire circumferential direction (see FIG. 8), or may extend parallel with the tire lateral direction (see FIG. 9).

Additionally, in the configuration of FIG. 4, the narrow shallow grooves 7 have a linear shape. Such a configuration is preferable because the narrow shallow grooves 7 are easily formed.

Figure 10:
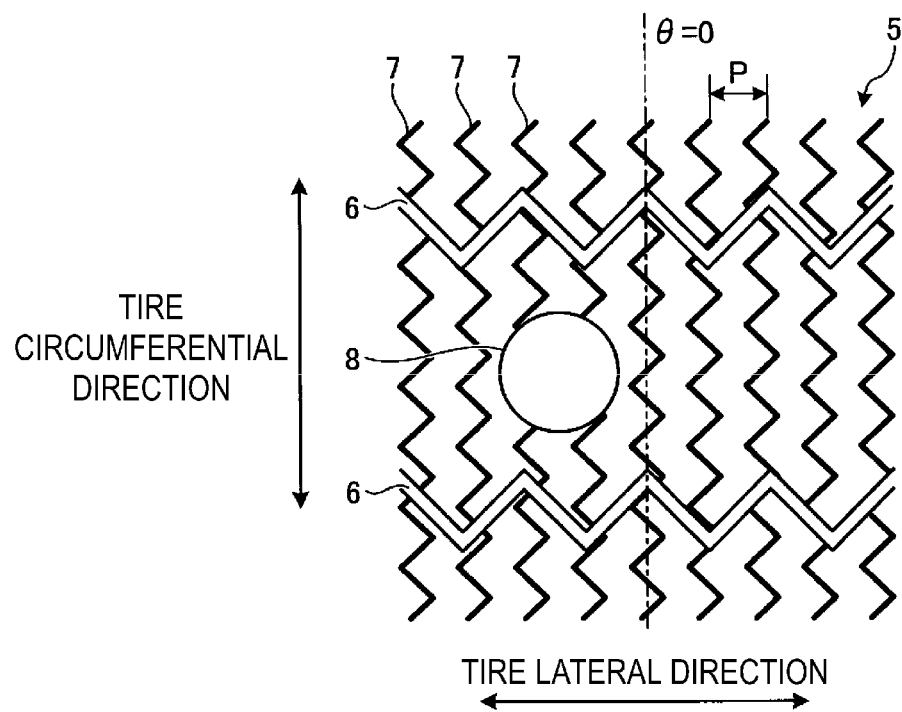
FIG. 10 is an explanatory diagram illustrating a modified example of the pneumatic tire illustrated in FIG. 4.
Figure 11:
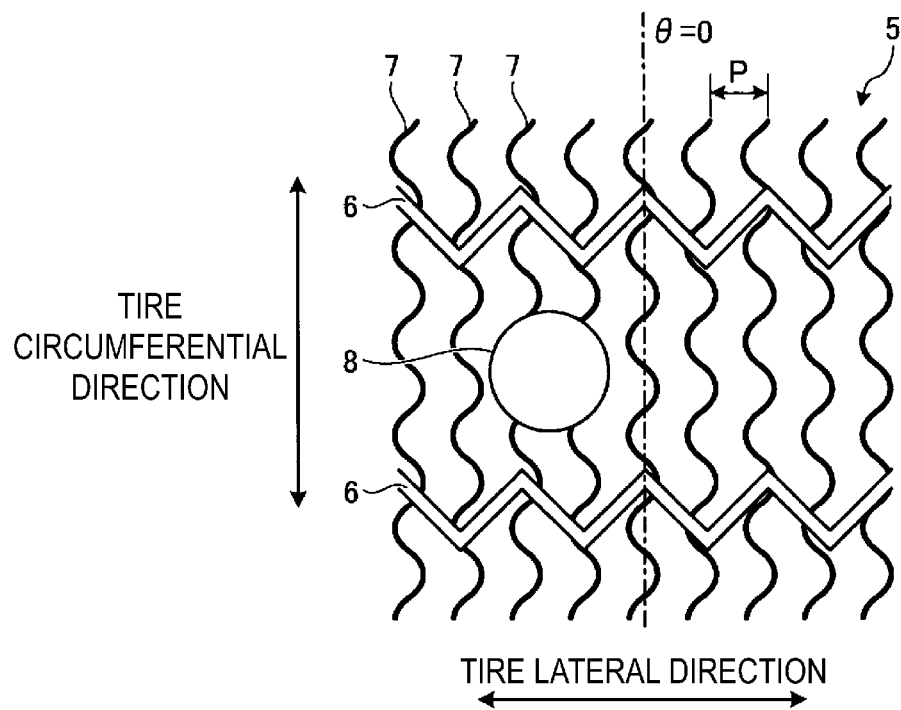
FIG. 11 is an explanatory diagram illustrating a modified example of the pneumatic tire illustrated in FIG. 4.
Figure 12:
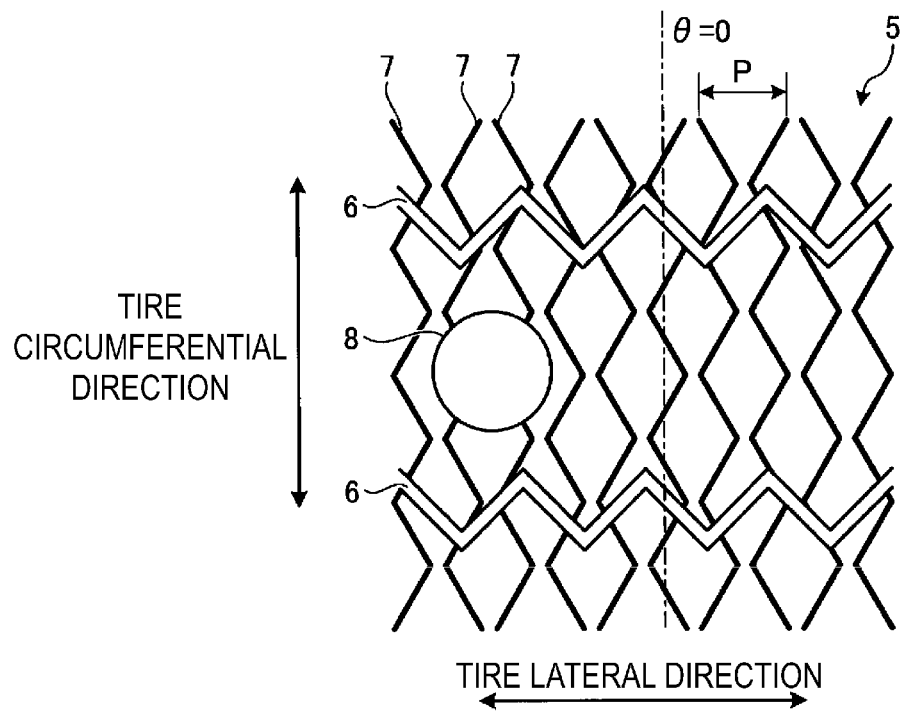
FIG. 12 is an explanatory diagram illustrating a modified example of the pneumatic tire illustrated in FIG. 4.
Figure 13:
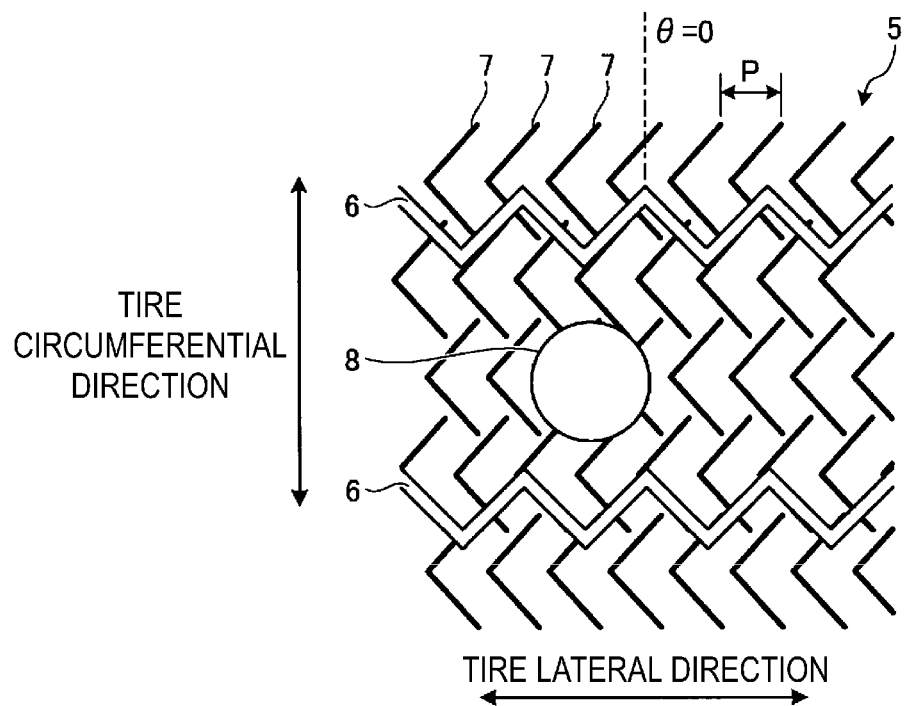
FIG. 13 is an explanatory diagram illustrating a modified example of the pneumatic tire illustrated in FIG. 4.
Figure 14:
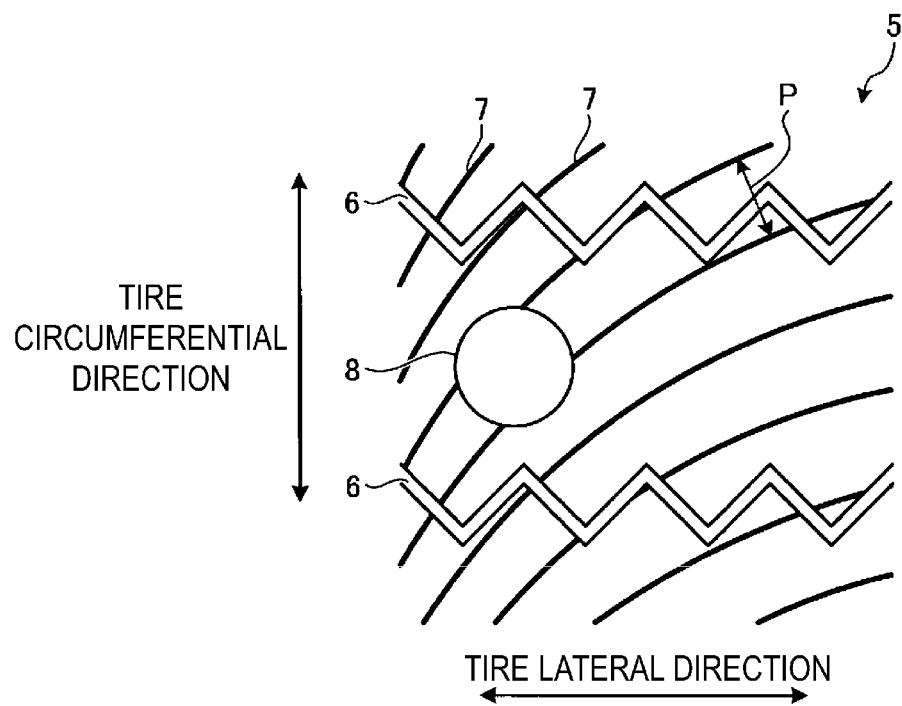
FIG. 14 is an explanatory diagram illustrating a modified example of the pneumatic tire illustrated in FIG. 4.

However, the present technology is not limited to such a configuration, and the narrow shallow grooves 7 may have a zigzag shape (see FIG. 10), or a wave-like shape (see FIG. 11). In such configurations, as illustrated in FIGS. 10 and 11, the plurality of narrow shallow grooves 7 may be disposed in phase with each other, or as illustrated in FIG. 12, may be disposed out of phase with each other. Additionally, as illustrated in FIG. 13, the narrow shallow grooves 7 may have a bent or curved short structure. In such configurations, the short narrow shallow grooves 7 may be arranged in rows offset from each other (see FIG. 13), or may be disposed arranged in a matrix (not illustrated). Additionally, the narrow shallow grooves 7 may have an arc shape (see FIG. 14), or may have a curved shape like an S-shape (not illustrated).

In the configurations of FIGS. 10 to 14, in a manner similar to that of the configurations of FIGS. 4, 8, and 9, the narrow shallow grooves 7 may incline at a predetermined angle θ with respect to the tire circumferential direction, may extend parallel with the tire circumferential direction, or may extend parallel with the tire lateral direction. Note that in configurations in which the narrow shallow grooves 7 have a zigzag shape or a wave-like shape, the inclination angle θ of the narrow shallow grooves 7 is measured with reference to the center of the amplitude of the zigzag shape or the wave-like shape.

Figure 15:
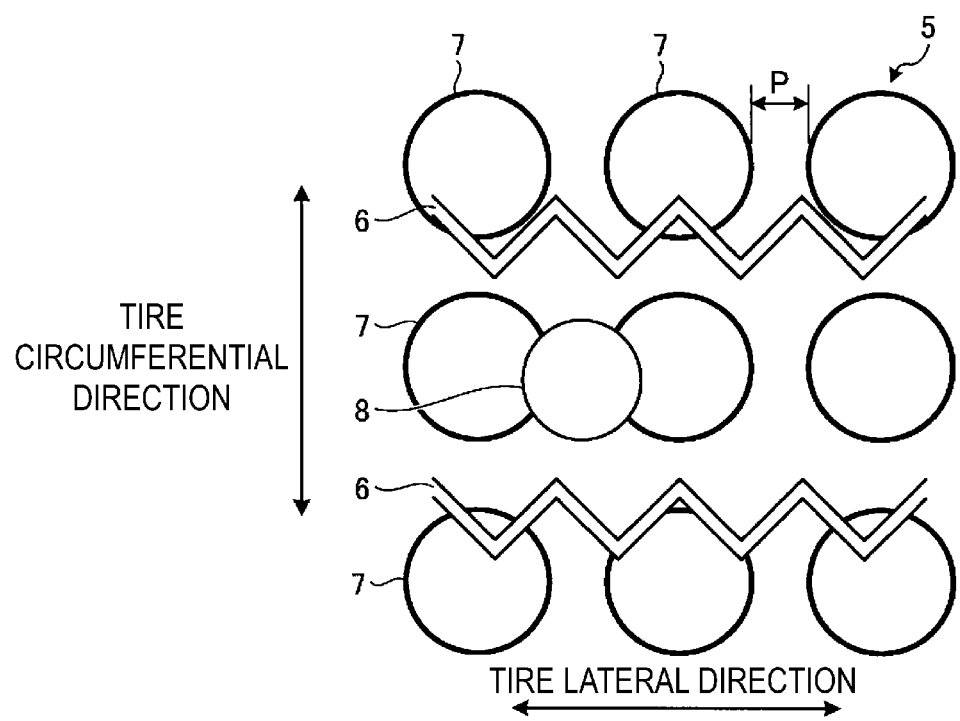
FIG. 15 is an explanatory diagram illustrating a modified example of the pneumatic tire illustrated in FIG. 4.
Figure 16:
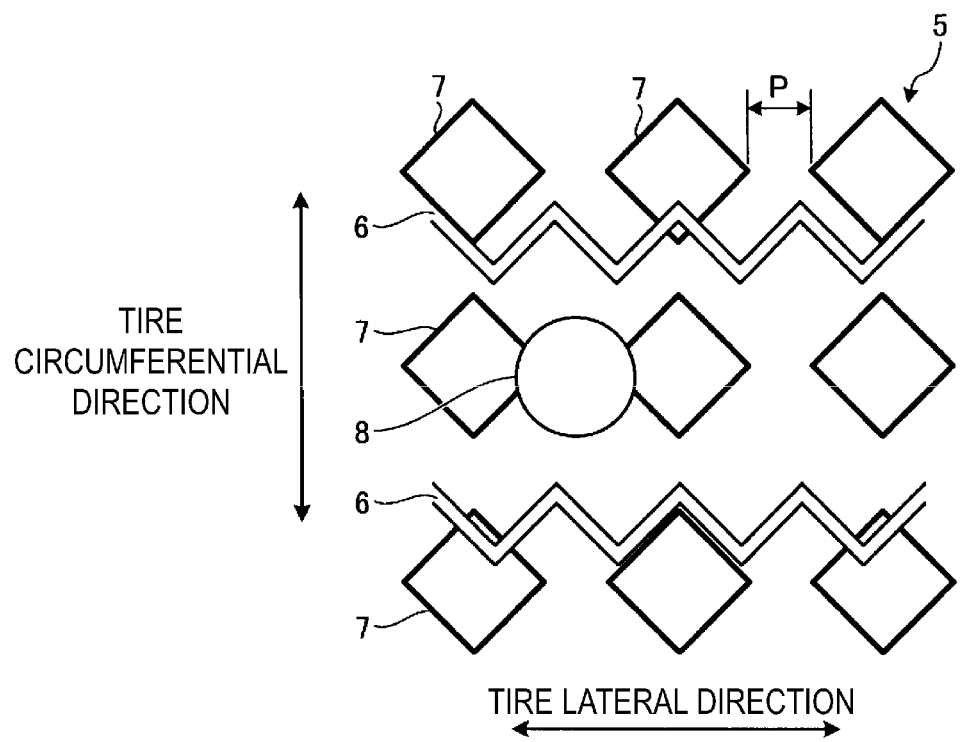
FIG. 16 is an explanatory diagram illustrating a modified example of the pneumatic tire illustrated in FIG. 4.

FIGS. 15 and 16 are explanatory diagrams of modified examples of the pneumatic tire illustrated in FIG. 4. These drawings illustrate the positional relationship between the sipes 6, the narrow shallow grooves 7, and the recessed portion 8.

In the configuration of FIG. 4, the narrow shallow grooves 7 have a linear structure that extends in a predetermined direction. Such a configuration is preferable because the narrow shallow grooves 7 can extend continuously throughout the entire region of the contact patch of the blocks 5.

However, the present technology is not limited to such a configuration, and as illustrated in FIGS. 15 and 16, the narrow shallow grooves 7 may have an annular structure and be disposed at predetermined pitches from each other. For example, the shape of the narrow shallow grooves 7 may be circular (FIG. 15), elliptical (not illustrated), or rectangular (FIG. 16), triangular, hexagonal, or another polygonal shape (not illustrated). In such a configuration also, the recessed portion 8 is disposed across separate adjacent narrow shallow grooves 7, 7.

Figure 17:
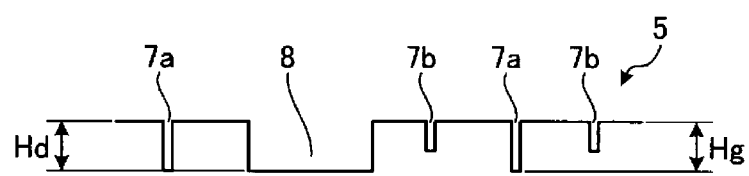
FIG. 17 is an explanatory diagram illustrating a modified example of the pneumatic tire illustrated in FIG. 5.

FIG. 17 is an explanatory diagram illustrating a modified example of the pneumatic tire illustrated in FIG. 5. The same drawing illustrates a cross-sectional view of narrow shallow grooves 7a, 7b and the recessed portion 8 in the depth direction.

In the configuration of FIG. 5, all of the narrow shallow grooves 7 have the same groove depth Hg.

Alternatively, in the configuration of FIG. 17, the groove depth of at least one of the narrow shallow grooves 7b is lower than the standard groove depth Hg of the narrow shallow groove 7a. In such a configuration, when tire wear advances, the narrow shallow grooves 7b with a lower groove depth disappear first. The narrow shallow grooves 7a with the greater groove depth Hg disappear thereafter. This configuration can suppress a change in the properties of the blocks 5 that is caused by simultaneous disappearance of all of the narrow shallow grooves 7.

FIGS. 18 to 21 are explanatory diagrams illustrated modified examples of the pneumatic tire illustrated in FIG. 4. These drawings illustrate the positional relationship between the sipes 6, the narrow shallow grooves 7, and the recessed portion 8.

In the configuration of FIG. 4, all of the narrow shallow grooves 7 are disposed in parallel with each other. As a result, the narrow shallow grooves 7 are disposed in a stripe-like manner in which the narrow shallow grooves 7 do not intersect with each other.

Figure 18:
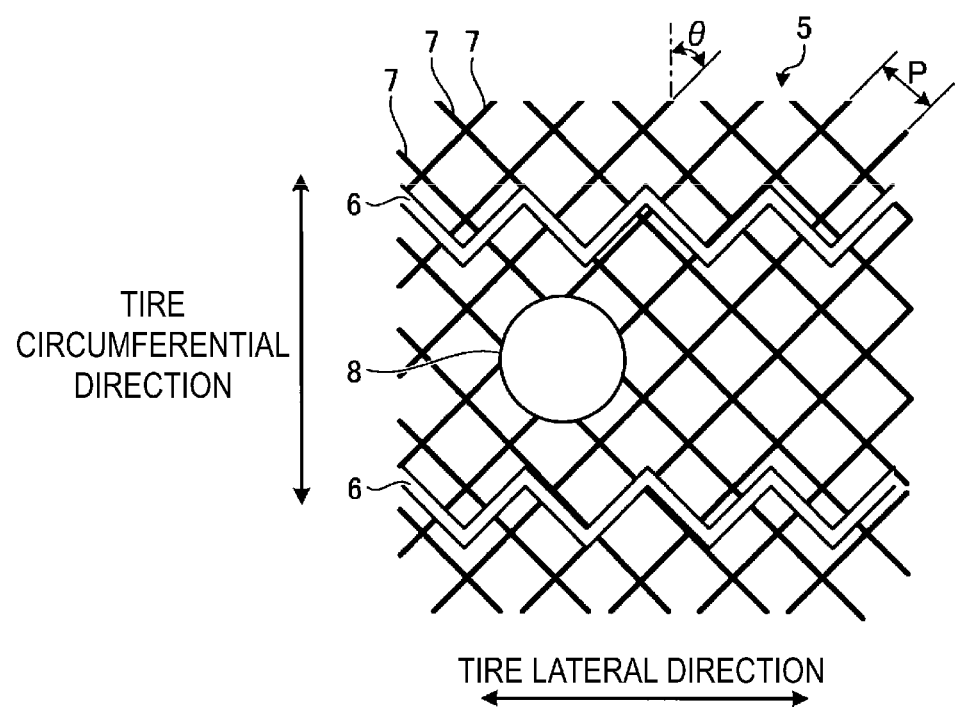
FIG. 18 is an explanatory diagram illustrating a modified example of the pneumatic tire illustrated in FIG. 4.
Figure 19:
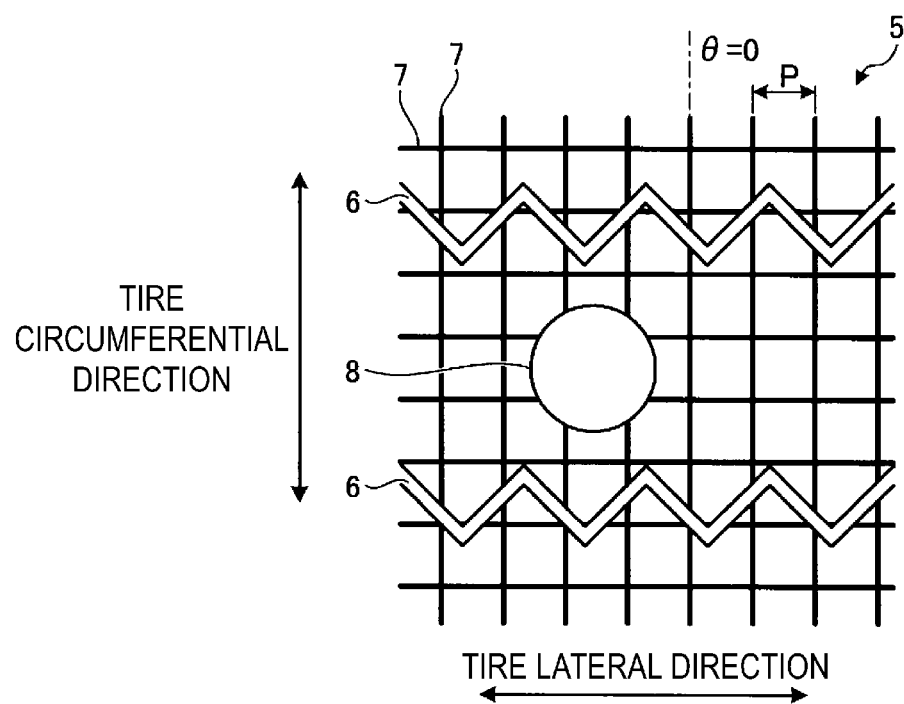
FIG. 19 is an explanatory diagram illustrating a modified example of the pneumatic tire illustrated in FIG. 4.
Figure 20:
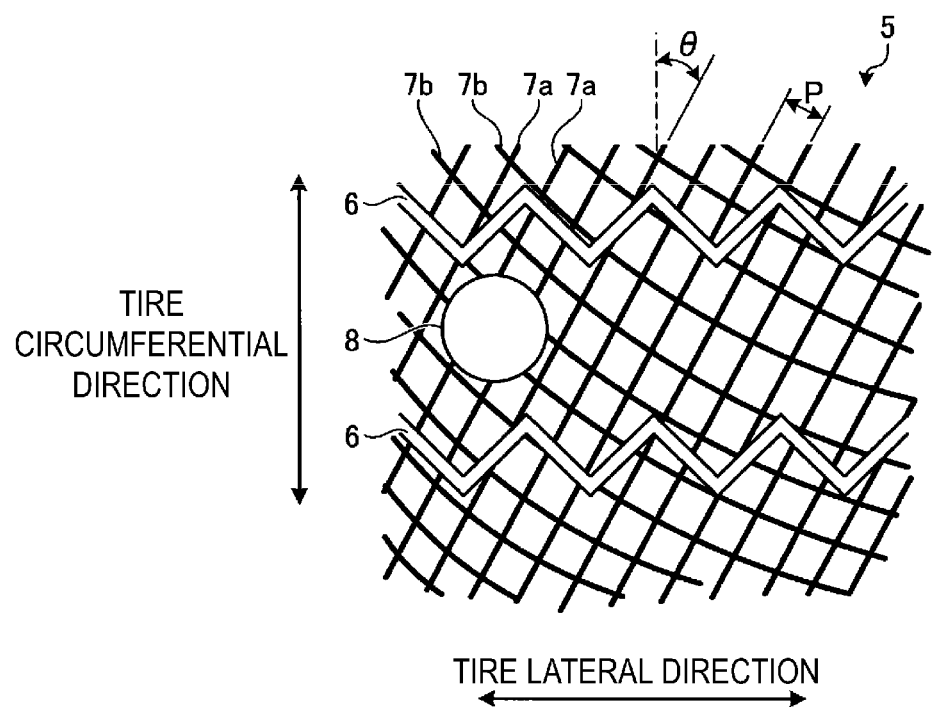
FIG. 20 is an explanatory diagram illustrating a modified example of the pneumatic tire illustrated in FIG. 4.
Figure 21:
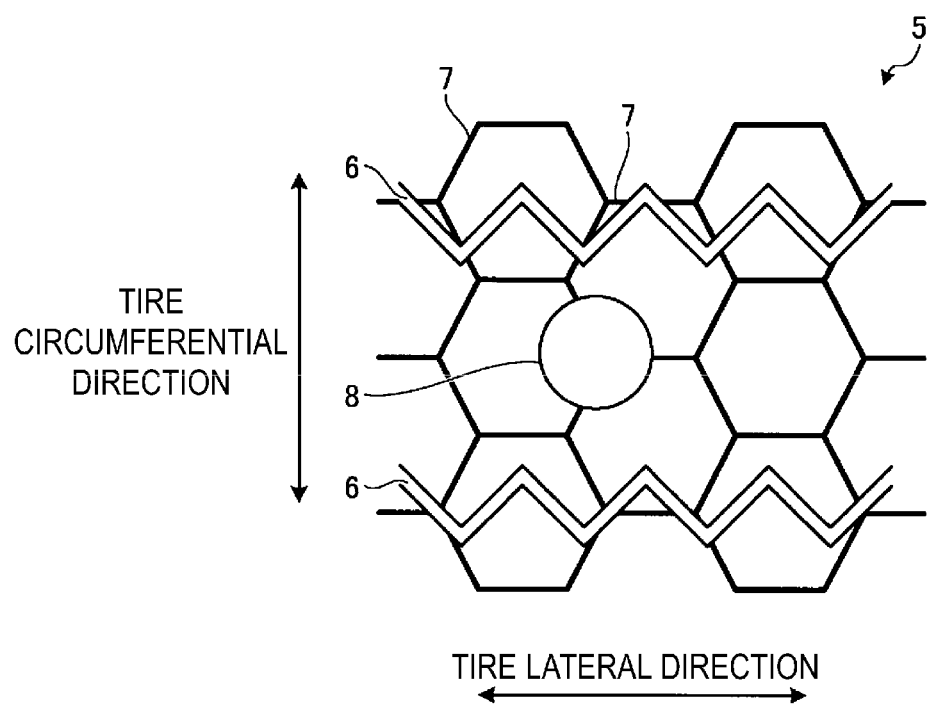
FIG. 21 is an explanatory diagram illustrating a modified example of the pneumatic tire illustrated in FIG. 4.

However, the present technology is not limited to such a configuration, and as illustrated in FIGS. 18 to 21, the narrow shallow grooves 7 may be disposed intersecting each other or communicating with each other. For example, as illustrated in FIGS. 18 and 19, the plurality of narrow shallow grooves 7 are disposed in a mesh-like manner. In such a configuration, the narrow shallow grooves 7 may be disposed at an incline with respect to the tire circumferential direction and the tire lateral direction (see FIG. 18) or disposed in parallel with the tire circumferential direction and the tire lateral direction (see FIG. 19). Additionally, at least one of the narrow shallow grooves 7, for example, may be disposed in an arc-like or wave-like curving manner (see FIG. 20). Additionally, the narrow shallow grooves 7 may have an annular structure and be disposed communicating with each other (FIG. 21). For example, in the configuration of FIG. 21, the narrow shallow grooves 7 are disposed in a honeycomb-like manner. Additionally, in these configurations, the recessed portion 8 is disposed intersecting two or more narrow shallow grooves 7 that do not intersect each other.

Second Modified Example

Figure 22:
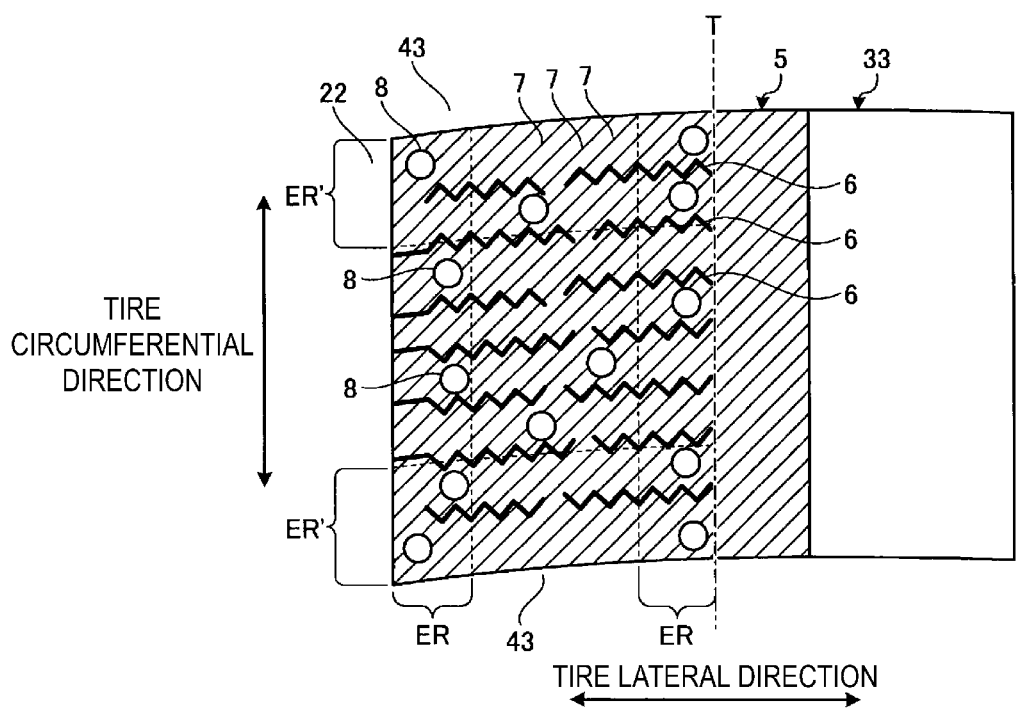
FIG. 22 is an explanatory diagram illustrating a modified example of the pneumatic tire illustrated in FIG. 2.
Figure 23:
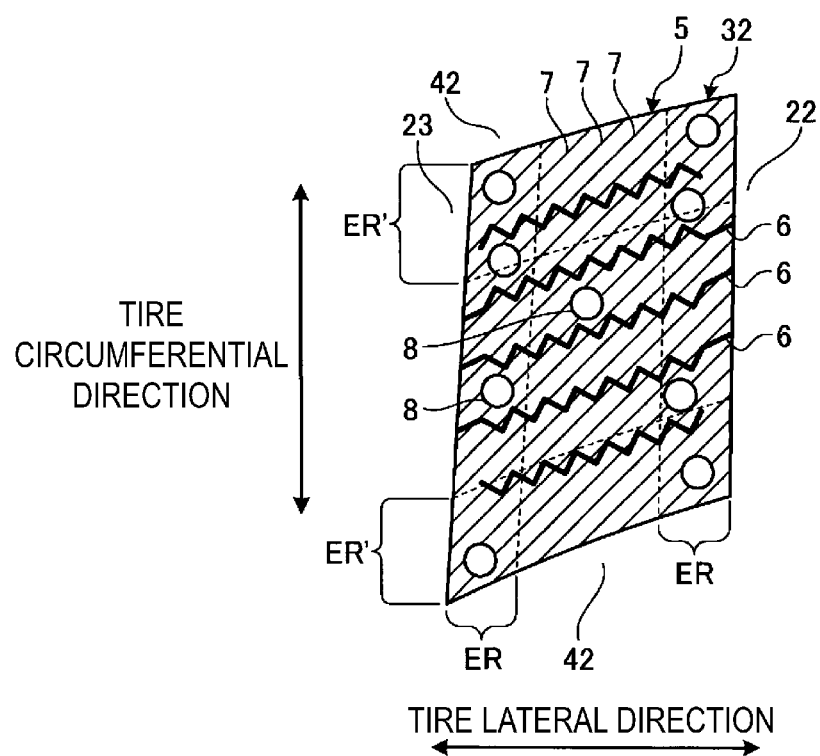
FIG. 23 is an explanatory diagram illustrating the modified example of the pneumatic tire illustrated in FIG. 2.
Figure 24:
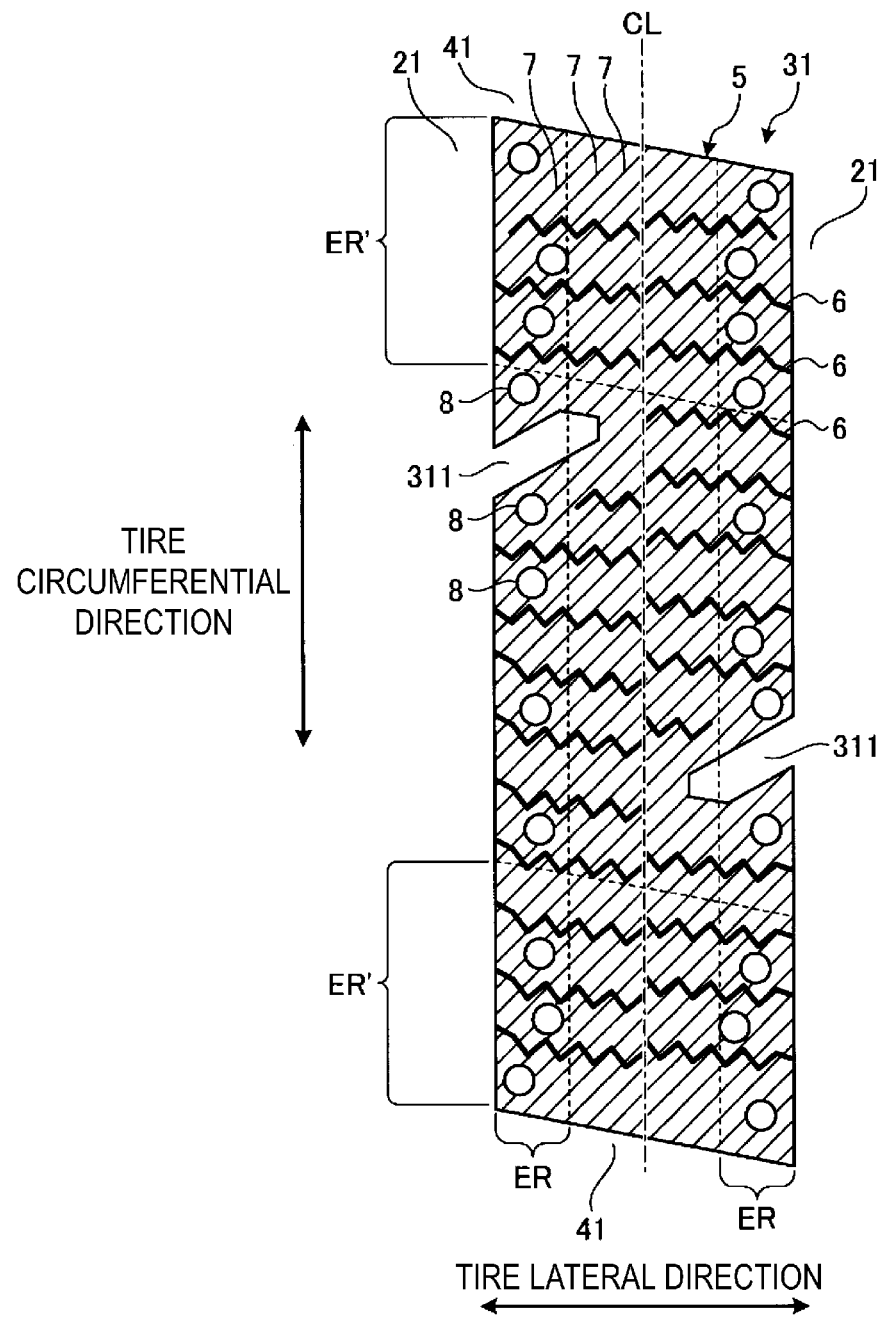
FIG. 24 is an explanatory diagram illustrating the modified example of the pneumatic tire illustrated in FIG. 2.

FIGS. 22 to 24 are explanatory diagrams illustrating a modified example of the pneumatic tire illustrated in FIG. 2. FIG. 22 is a plan view of one of the blocks 5 that compose the shoulder land portion 33. FIG. 23 is a plan view of one of the blocks 5 that compose the second land portion 32. FIG. 24 is a plan view of one of the blocks 5 that compose the center land portion 31.

In the configuration of FIG. 2, the plurality of recessed portions 8 are disposed unevenly in the continuous contact patch of one block 5 so that, as defined above for the continuous contact patch, the opening area ratio Se of the recessed portions 8 in the end portion regions ER in the tire lateral direction is greater than the opening area ratio Sc of the recessed portions 8 in the central portion region in the tire lateral direction (Sc<Se). Specifically, as illustrated in FIGS. 3, 6, and 7, all of the block 5 of the land portions 31 to 33 have the relationship Nc<Ne, wherein Ne is the disposal number of recessed portions 8 in the end portion regions ER in the tire lateral direction and Nc is the disposal number of recessed portions 8 in the central portion region in the tire lateral direction.

Alternatively, in the modified examples of FIGS. 22 to 24, the opening area ratio Se' of the recessed portions 8 in the end portion regions ER' in the tire circumferential direction defined at the continuous contact patch and the opening area ratio Sc' of the recessed portions 8 in the central portion region in the tire circumferential direction have the relationship Sc'<Se'. Additionally, the opening area ratios Se', Sc' of the recessed portions 8 preferably have the relationship 1.50≤Se'/Sc', and more preferably have the relationship 3.00≤Se'/Sc'. The maximum value of the ratio Se'/Sc' is not particularly limited but is constrained by its relationship with the disposal density and opening area of the recessed portions 8. In a configuration in which all of the recessed portions 8 are disposed in the end portion regions ER', Sc' is equal to zero, thus satisfying the condition Sc'<Se'.

The central portion region in the tire circumferential direction is defined as the region in the central portion occupying 50% of the continuous contact patch in the tire circumferential direction (see FIG. 22). The end portion region in the tire circumferential direction is defined as the region of the front and back end portions each occupying 25% of the continuous contact patch in the tire circumferential direction. The central portion region and the end portion regions are defined excluding notched portions partially formed in the land portions 31 to 33. Additionally, the contact patch of each block 5 that composes the row of blocks is divided into a central portion region and end portion regions. Note that the dashed lines of FIG. 22 indicate the boundary lines between the central portion region and the end portion regions.

Specifically, in reference to FIGS. 22 to 24, by the disposal number Ne' of recessed portions 8 in the end portion regions ER' in the tire circumferential direction in one block 5 and the disposal number Nc' of the recessed portions 8 in the central portion region in the tire circumferential direction having the relationship Nc'<Ne', the condition Sc'<Se' for the opening area ratio of the recessed portions 8 is satisfied. Additionally, the disposal numbers Ne', Nc' of the recessed portions 8 preferably have the relationship 1.50≤Ne'/Nc', and more preferably the relationship 3.00≤Ne'/Nc'. The maximum value of the ratio Ne'/Nc' is not particularly limited but is constrained by its relationship with the disposal density of the recessed portions 8. In a configuration in which all of the recessed portions 8 are disposed in the end portion regions ER', Nc' is equal to zero, thus satisfying the conditions Nc'<Ne' and Sc'<Se'.

Additionally, in a configuration in which the land portions are formed by a plurality of blocks arranged in the tire circumferential direction (see FIG. 2), 70% or more, and preferably 80% or more of the blocks 5 that compose one row of blocks preferably satisfy the conditions Nc'<Ne' and Sc'<Se' for the recessed portions 8 described above. In the entire tread, it is only required that at least one land portion satisfies the conditions for the row of blocks.

In the configuration described above, the recessed portions 8 are disposed densely in the end portion regions ER' of the blocks 5 where a film of water is likely to form. Thus, a film of water on the road contact surface with an icy road surface is efficiently absorbed due to the water absorbing function provided by the recessed portions 8. As a result, the adhesive properties of the block road contact surface to an icy road surface is improved, and the braking performance on ice of the tire is improved. Additionally, by disposing the recessed portions 8 sparsely in the central portion region, the contact patch area of the central portion region of the block 5 is ensured and the braking performance on ice of the tire is improved.

For example, in the configuration of FIG. 22, one block 5 of the shoulder land portion 33 includes a total of 13 recessed portion 8 in the contact patch. Specifically, a total of eight recessed portions 8 are disposed in the front and back end portion regions ER' in the tire circumferential direction and five recessed portions 8 are disposed in the central portion region (reference sign is omitted in the drawings) in the tire circumferential direction. Additionally, the recessed portions 8 have the same opening shape and the same opening area. The disposal number Ne' of the recessed portions 8 in the end portion regions ER' in the tire circumferential direction and the disposal number Nc' of the recessed portions 8 in the central portion region in the tire circumferential direction have the relationship Ne'/Nc'=8/5=1.60. Additionally, in one of the shoulder land portions 33, all of the recessed portions 8 of the blocks 5 satisfy the condition Nc'<Ne' described above.

In particular, the shoulder land portions 33 have a great effect on the braking performance of the tire. Thus, by the recessed portions 8 being densely disposed in the end portion regions ER' in the tire circumferential direction of the block 5 of the shoulder land portion 33, the function of the recessed portions 8 to improve braking performance on ice is significantly obtained.

Additionally, in the configuration of FIG. 23, one block 5 of the second land portion 32 located outward in the tire lateral direction (see FIG. 2) includes a total of nine recessed portion 8 in the contact patch. Specifically, a total of six recessed portions 8 are disposed in the front and back end portion regions ER' in the tire circumferential direction and three recessed portions 8 are disposed in the central portion region (reference sign is omitted in the drawings) in the tire circumferential direction. Additionally, the recessed portions 8 have the same opening shape and the same opening area. The disposal number Ne' of the recessed portions 8 in the end portion regions ER' of the block 5 in the tire circumferential direction and the disposal number Nc' of the recessed portions 8 in the central portion region in the tire circumferential direction have the relationship Ne'/Nc'=6/3=2.00. Additionally, in one of the second land portions 32, all of the recessed portions 8 of the blocks 5 satisfy the condition Nc'<Ne' described above.

In particular, the second land portions 32 have a great effect on the driving/braking performance of the tire. Thus, by the recessed portions 8 being densely disposed in the end portion regions ER' in the tire circumferential direction of the block 5 of the second land portion 32, a film of water can be efficiently absorbed at the end portion regions ER' where a film of water is likely to form, and the function of the recessed portions 8 to improve braking performance on ice is significantly obtained.

Additionally, in the configuration of FIG. 24, one block 5 of the center land portion 31 includes a total of 22 recessed portion 8 in the contact patch. Specifically, a total of 13 recessed portions 8 are disposed in the front and back end portion regions ER' in the tire circumferential direction and nine recessed portions 8 are disposed in the central portion region (reference sign is omitted in the drawings) in the tire circumferential direction. Additionally, the recessed portions 8 have the same opening shape and the same opening area. The disposal number Ne' of the recessed portions 8 in the end portion regions ER' in the tire circumferential direction and the disposal number Nc' of the recessed portions 8 in the central portion region in the tire circumferential direction have the relationship Ne'/Nc'=13/9=1.44. Additionally, in one of the center land portions 31, all of the recessed portions 8 of the blocks 5 satisfy the condition Nc'<Ne' described above.

In particular, the center land portion 31 has a great effect on the driving performance of the tire. Thus, by the recessed portions 8 being densely disposed in the end portion regions ER' in the tire circumferential direction of the block 5 of the center land portion 31, the edge components are increased and the effect of improving the driving performance of the tire provided by the recessed portions 8 is significantly obtained.

Third Modified Example

Figure 25:
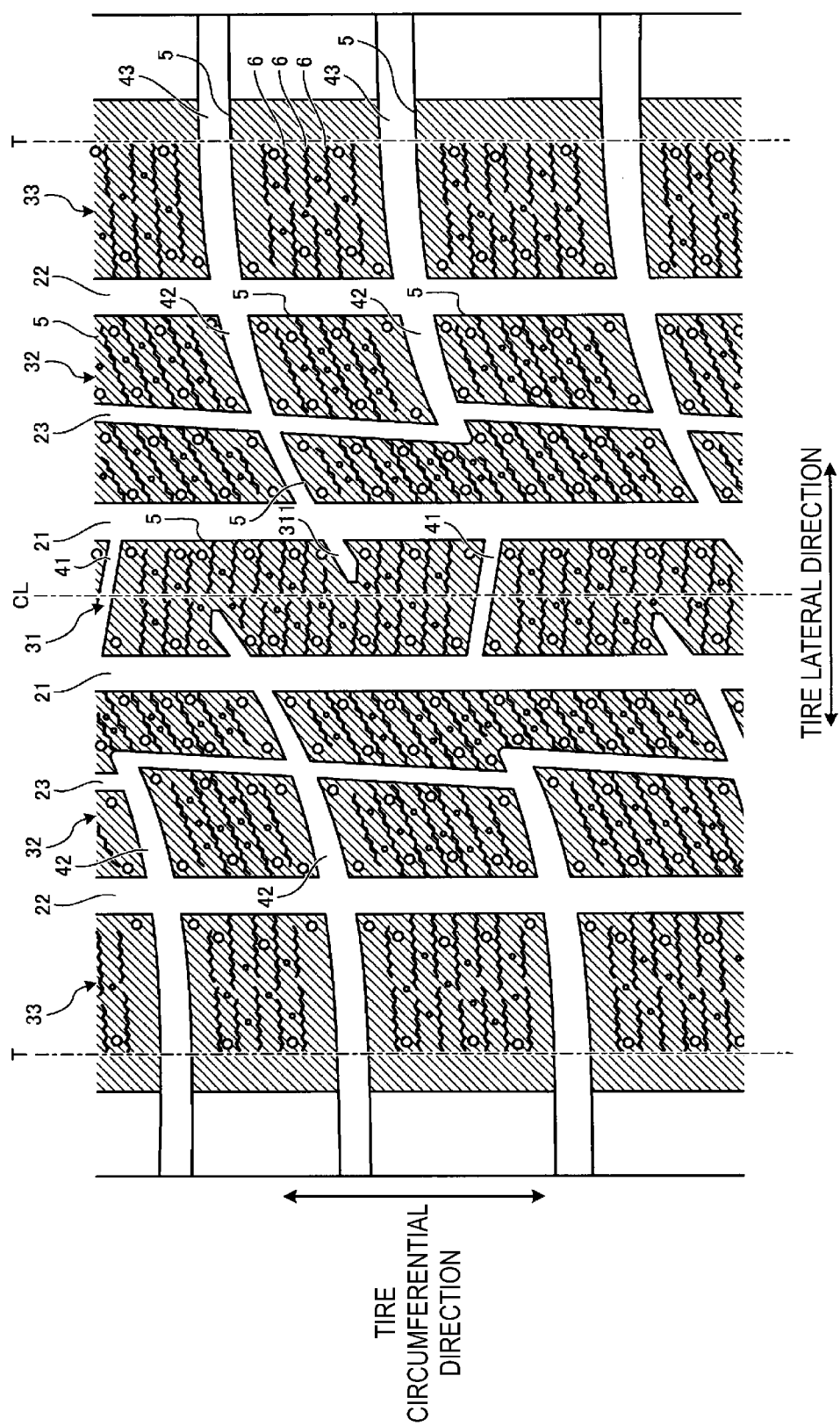
FIG. 25 is an explanatory diagram illustrating a modified example of the pneumatic tire illustrated in FIG. 2.
Figure 26:
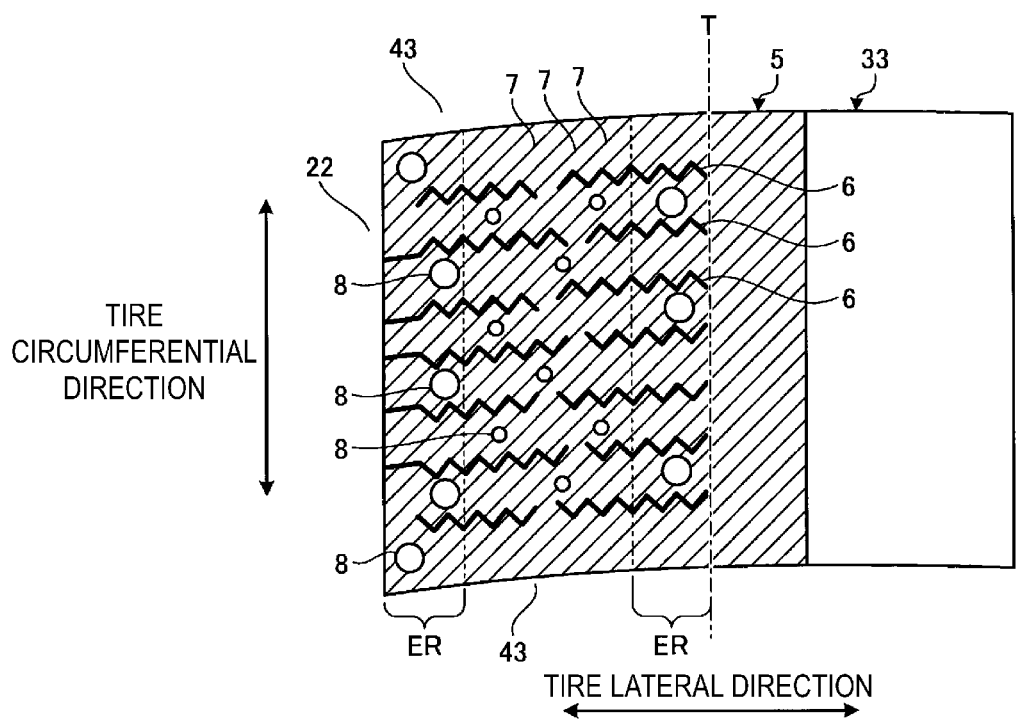
FIG. 26 is an explanatory diagram illustrating a land portion of the pneumatic tire illustrated in FIG. 25.
Figure 27:
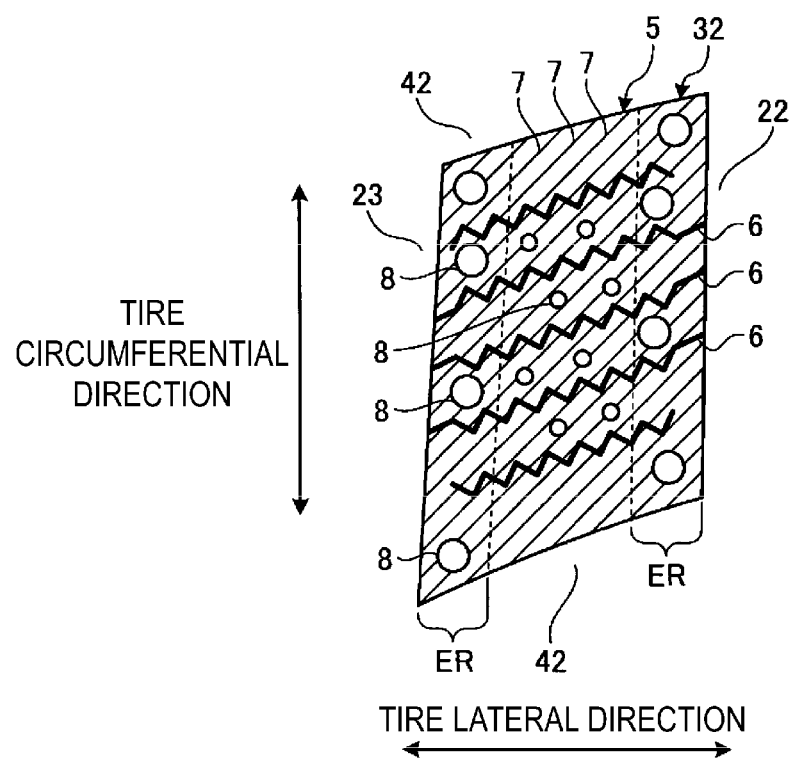
FIG. 27 is an explanatory diagram illustrating a land portion of the pneumatic tire illustrated in FIG. 25.
Figure 28:
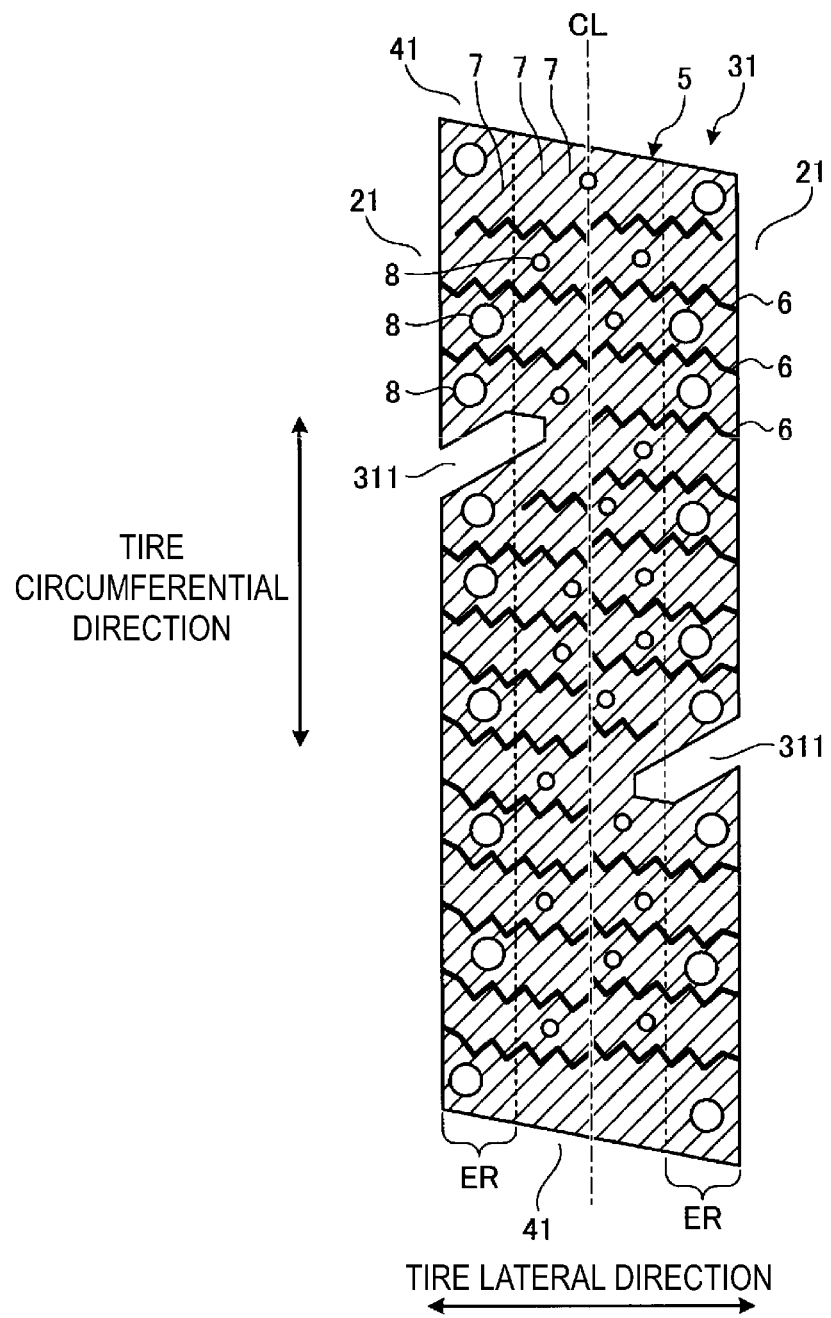
FIG. 28 is an explanatory diagram illustrating a land portion of the pneumatic tire illustrated in FIG. 25.

FIGS. 25 to 28 are explanatory diagrams illustrating a modified example of the pneumatic tire illustrated in FIG. 2. FIG. 25 is a plan view of the tread surface of the pneumatic tire 1. FIG. 26 is a plan view of one of the blocks 5 that compose the shoulder land portion 33. FIG. 27 is a plan view of one of the blocks 5 that compose the second land portion 32. FIG. 28 is a plan view of one of the blocks 5 that compose the center land portion 31.

In the configuration of FIG. 2, as described above, by disposing the plurality of recessed portions 8 unevenly in the contact patch of one block 5, the opening area ratio Se of the recessed portions 8 in the end portion regions ER of one block 5 in the tire lateral direction is made greater than the opening area ratio Sc of the recessed portions 8 in the central portion region in the tire lateral direction (Sc<Se). Specifically, as illustrated in FIGS. 3, 6, and 7, the recessed portions 8 are densely disposed in the left and right end portion regions ER, ER of the block 5 in the tire lateral direction. Additionally, the recessed portions 8 of the land portions 31 to 33 have the same opening shape and the same opening area.

However, the present technology is not limited to such a configuration, and by the plurality of recessed portions 8 having different opening areas in the contact patch of one rib or block, the opening area ratio Se of the recessed portions 8 in the end portion regions of one rib or block in the tire lateral direction may be made greater than the opening area ratio Sc of the recessed portions 8 in the central portion region in the tire lateral direction (Sc<Se). In other words, the recessed portions 8 with a relatively large opening area are disposed in the end portion regions ER in the tire lateral direction.

Specifically, in the configurations of FIGS. 26 to 28, by the average value Ae of the opening area of the recessed portions 8 in the end portion regions ER in the tire lateral direction and the average value Ac of the opening area of the recessed portions 8 in the central portion region (reference sign is omitted in the drawings) in the tire lateral direction having the relationship Ac<Ae, the condition Sc<Se for the opening area of the recessed portions 8 is satisfied. Additionally, the average values Ae, Ac of the opening area of the recessed portions 8 preferably have the relationship $1.5 \leq Ae/Ac \leq 4.0$, and more preferably the relationship $2.0 \leq Ae/Ac \leq 3.0$. In a configuration in which all of the recessed portions 8 are disposed in the end portion regions ER, Ac is equal to zero, thus satisfying the conditions Ac<Ae and Sc<Se.

The average values Ac, Ae of the opening area are each calculated as the ratio between the sum of the opening area of the recessed portions in a predetermined region and the total number of recessed portions in the predetermined region.

Additionally, in a configuration in which the land portions are formed by a plurality of blocks arranged in the tire circumferential direction (see FIG. 2), 70% or more, and preferably 80% or more of the blocks 5 that compose one row of blocks preferably satisfy the conditions Ac<Ae and Sc<Se for the opening area of the recessed portions 8 described above. In the entire tread, it is only required that at least one land portion satisfies the conditions for the row of blocks.

In the configuration described above, the recessed portions 8 with a relatively large opening area are disposed in the end portion regions ER of the blocks 5 where a film of water is likely to form during travel on icy road surfaces. Thus, a film of water on the road contact surface with an icy road surface is efficiently absorbed due to the water absorbing function provided by the recessed portions 8. As a result, the adhesive properties of the block road contact surface to an icy road surface is improved, and the braking performance on ice of the tire is improved. Additionally, by disposing the recessed portions 8 with a relatively small opening area in the central portion region, the contact patch area of the central portion region of the block 5 is ensured and the braking performance on ice of the tire is improved.

For example, in the configuration of FIG. 26, one block 5 of the shoulder land portion 33 includes a total of 16 recessed portions 8 in the contact patch. Specifically, eight recessed portions 8 are individually disposed in the end portion regions ER and the central portion region (reference sign is omitted in the drawings) in the tire lateral direction. The recessed portions 8 have the same opening shape. Additionally, the recessed portions 8 with a relatively large opening area are disposed in the end portion regions ER, and the recessed portions 8 with a relatively small opening area are disposed in the central portion region. As a result, the condition Ac<Ae for the opening area of the recessed portions 8 and the condition Sc<Se for the opening area ratio are both satisfied in each region. Additionally, in the shoulder land portion 33, the recessed portions 8 in all of the blocks 5 satisfy the conditions Ac<Ae and Sc<Se described above (see FIG. 25).

In the configuration of FIG. 27, one block 5 of the second land portion 32 located outward in the tire lateral direction (see FIG. 25) includes a total of 16 recessed portions 8 in the contact patch. Specifically, eight recessed portions 8 are individually disposed in the end portion regions ER and the central portion region (reference sign is omitted in the drawings) in the tire lateral direction. The recessed portions 8 have the same opening shape. Additionally, the recessed portions 8 with a relatively large opening area are disposed in the end portion regions ER, and the recessed portions 8 with a relatively small opening area are disposed in the central portion region. As a result, the condition Ac<Ae for the opening area of the recessed portions 8 and the condition Sc<Se for the opening area ratio are both satisfied in each region. Additionally, in the second land portion 32, the recessed portions 8 in all of the blocks 5 satisfy the conditions Ac<Ae and Sc<Se described above (see FIG. 25).

Additionally, in the configuration of FIG. 28, one block 5 of the center land portion 31 includes a total of 37 recessed portions 8 in the contact patch. Specifically, a total of 18 recessed portions 8 are disposed in the left and right end portion regions ER in the tire lateral direction and nineteen recessed portions 8 are disposed in the central portion region (reference sign is omitted in the drawings) in the tire lateral direction. The recessed portions 8 have the same opening shape. Additionally, the recessed portions 8 with a relatively large opening area are disposed in the end portion regions ER, and the recessed portions 8 with a relatively small opening area are disposed in the central portion region. The condition Ac<Ae for the opening area of the recessed portions 8 and the condition Sc<Se for the opening area ratio are both satisfied in each region. Additionally, in the center land portion 31, the recessed portions 8 in all of the blocks 5 satisfy the conditions Ac<Ae and Sc<Se described above (see FIG. 25).

In the configuration described above, 70% or more, and preferably 80% or more of the recessed portions 8 disposed in the end portion regions ER in the tire lateral direction preferably have an opening area larger than the average value of the opening area of the recessed portions 8 disposed in the block 5. In other words, the majority of the larger recessed portions 8 are disposed in the end portion regions ER. As a result, a film of water formed in the end portion regions ER during travel on icy road surfaces is efficiently absorbed by the larger recessed portions 8. For example, in the configurations of FIGS. 25 to 28, one block 5 is provided with two types of recessed portions 8 with differing opening areas, and all of the recessed portions 8 with the larger opening area are disposed in the end portion regions ER. Additionally, only the larger recessed portions 8 are disposed in the end portion regions ER, and only the smaller recessed portions 8 are disposed in the central portion region. As a result, the regions are provided with recessed portions 8 of different sizes. As a result, a distinctive arrangement pattern of the recessed portions 8 is formed.

However, the present technology is not limited to such a configuration and at least one of the smaller recessed portions may be disposed in the end portion regions ER (not illustrated).

Additionally, in the configuration described above, the recessed portions 8 with an opening area greater than the average value are preferably disposed on the outermost side of the continuous contact patch in the tire lateral direction. In other words, the recessed portions 8 with an opening area greater than the average value are disposed closer to the edge portions of the land portions 31 to 33 than the other smaller recessed portion 8. The edge portions of the land portions 31 to 33 are subject to high ground contact pressure and, during travel on icy road surfaces, a film of water is likely to form on the edge portions. Accordingly, by disposing the larger recessed portions 8 in the edge portions of the land portions 31 to 33, the film of water on the road contact surface is efficiently absorbed by the larger recessed portions 8. For example, in the configuration of FIGS. 25 to 28, the larger recessed portions 8 are disposed along the edges of the block 5 proximal to the circumferential grooves 21 to 23. Thus, the water absorbing function of the recessed portions 8 is increased.

Additionally, in the configuration described above, the land portions 31 to 33 are rows of blocks that include a plurality of blocks 5, and include a plurality of sipes 6 and a plurality of types of recessed portion 8 with differing opening areas. The plurality of sipes 6 are disposed side by side in the tire circumferential direction and divide the land portions 31 to 33 into a plurality of sections. The recessed portions 8 with an opening area larger than the average value are preferably disposed in at least one of three sections adjacent in the tire circumferential direction. In other words, three discretionary adjacent sections defined by the sipes 6 include at least one larger recessed portion 8. As a result, by the larger recessed portions 8 being disposed in a dispersed manner in the tire circumferential direction, during travel on icy road surfaces, a film of water on the road contact surface is efficiently absorbed. For example, in the configuration of FIGS. 25 to 28, one or both of two discretionary adjacent sections defined by the sipes 6 include a larger recessed portion 8. Thus, the recessed portions 8 are disposed densely in each section in the tire circumferential direction.

Additionally, in the configuration described above, the land portions 31 to 33 are rows of blocks that include a plurality of block 5, and the recessed portions 8 with an opening area greater than the average value are preferably disposed in the corner portions of the blocks 5. The corner portions of the blocks 5 are subject to high ground contact pressure and, during travel on icy road surfaces, a film of water is likely to form on the edge portions. Accordingly, by disposing the recessed portions 8 in the corner portions of the blocks 5, a film of water formed on the road contact surface during travel on icy road surfaces is efficiently absorbed. For example, in the configuration of FIGS. 25 to 28, the larger recessed portions 8 are disposed in all of the corner portions of the blocks 5 formed where the circumferential grooves 21 to 23 and the lug grooves 41 to 43 meet (see FIG. 25). Furthermore, the larger recessed portions 8 are also disposed in the corner portions of the notched portions 311 formed in the center land portion 31 (see FIG. 28). Thus, the water absorbing function of the recessed portions 8 is increased.

Note that in the configuration of FIGS. 25 to 28, the disposal number Nc of the recessed portions 8 in the central portion region of each block 5 and the disposal number Ne of the recessed portions 8 in the end portion regions ER are substantially the same, and the disposal densities of the recessed portions 8 in the regions are substantially the same. Additionally, the disposal numbers Ne, Nc of the recessed portions 8 in each region preferably have the relationship $0.90 \leq Ne/Nc \leq 1.10$. As a result, the recessed portions 8 are disposed in the blocks 5 with a uniform disposal density.

However, the present technology is not limited to such a configuration, and in addition to the condition Ac<Ae described above, the disposal numbers Ne, Nc of the recessed portions 8 in each region may have the relationship $1.20 \leq Ne/Nc$, and more preferably the relationship $1.50 \leq Ne/Nc$. In other words, in the end portion regions ER in the tire lateral direction, the recessed portions 8 have a relatively large opening area and are disposed densely. As a result, the ratio Ae/Ac of the opening area of the recessed portions 8 in each region can be reduced while the condition Sc<Se for the opening area ratio of the recessed portions 8 in each region can be efficiently adjusted.

Fourth Modified Example

Figure 29:
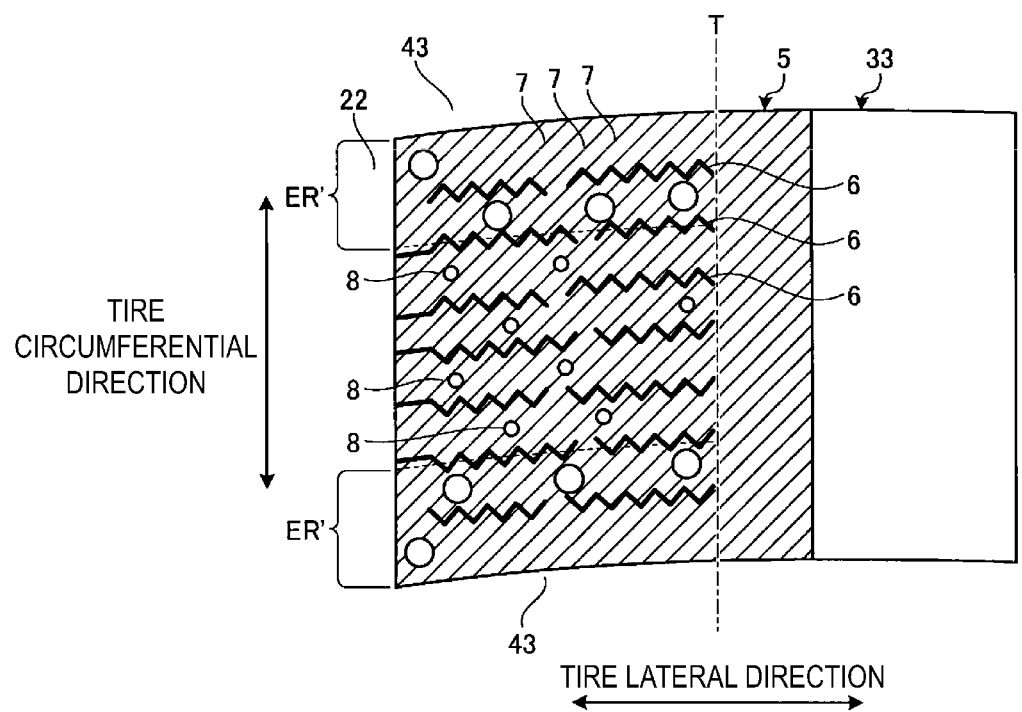
FIG. 29 is an explanatory diagram illustrating a modified example of the pneumatic tire illustrated in FIG. 25.
Figure 30:
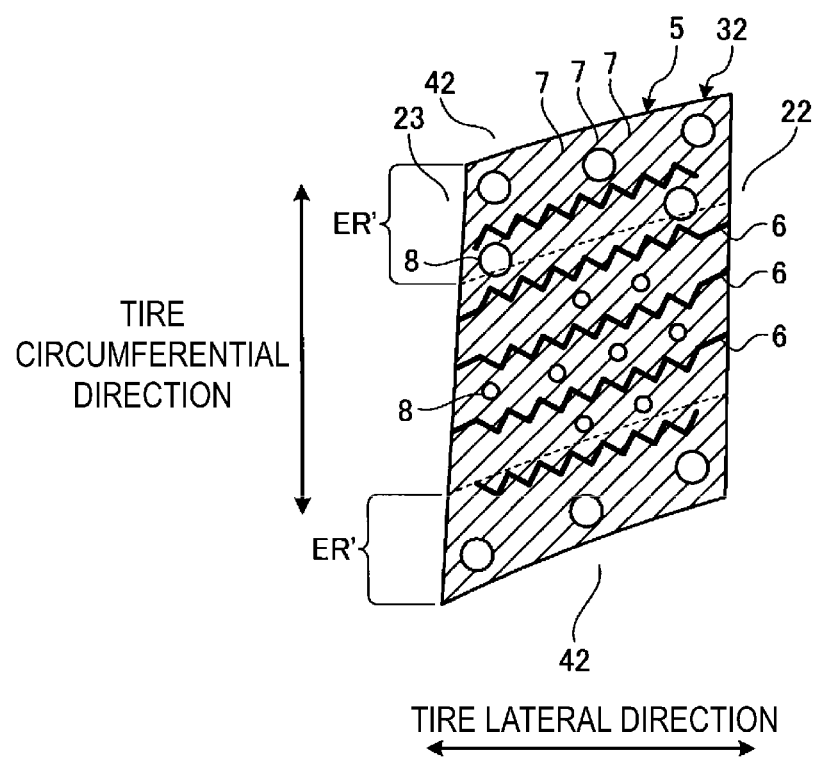
FIG. 30 is an explanatory diagram illustrating the modified example of the pneumatic tire illustrated in FIG. 25.
Figure 31:
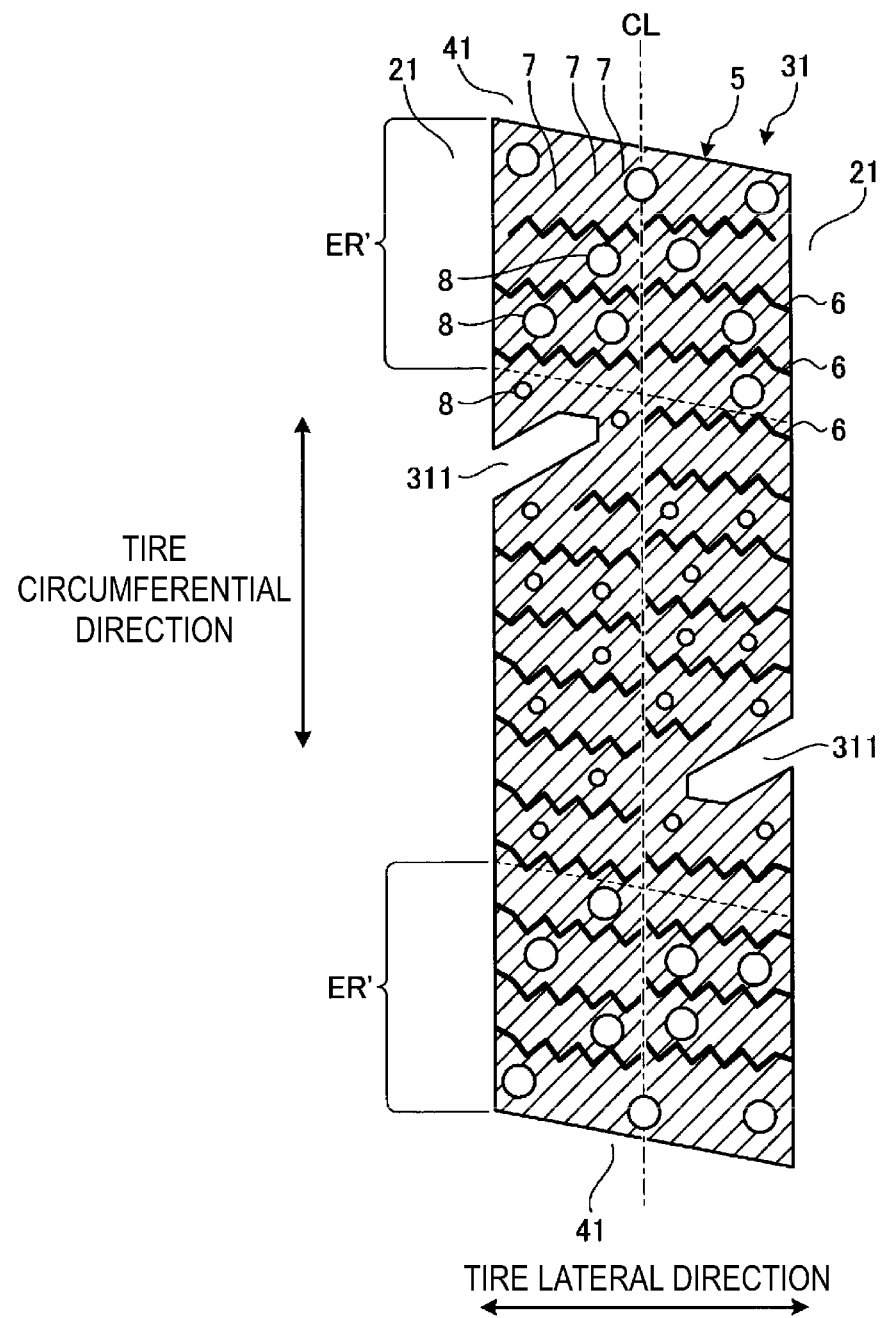
FIG. 31 is an explanatory diagram illustrating the modified example of the pneumatic tire illustrated in FIG. 25.

FIGS. 29 to 31 are explanatory diagrams illustrating a modified example of the pneumatic tire illustrated in FIG. 25. FIG. 29 is a plan view of one of the blocks 5 that compose the shoulder land portion 33. FIG. 30 is a plan view of one of the blocks 5 that compose the second land portion 32. FIG. 31 is a plan view of one of the blocks 5 that compose the center land portion 31.

In the configuration of FIG. 25, as illustrated in FIGS. 26 to 28 described above, the plurality of recessed portions 8 are given different opening areas in the contact patch of one rib or block so that the opening area ratio Se of the recessed portions 8 in the end portion regions in the tire lateral direction of one rib or block is greater than the opening area ratio Sc of the recessed portions 8 in the central portion region in the tire lateral direction (Sc<Se).

However, the present technology is not limited to such a configuration, and the plurality of recessed portions 8 may be given different opening areas in the contact patch of one rib or block so that the opening area ratio Se' of the recessed portions 8 in the end portion regions ER' in the tire circumferential direction of one rib or block is greater than the opening area ratio Sc' of the recessed portions 8 in the central portion region in the tire circumferential direction (Sc'<Se'). In other words, the recessed portions 8 with a relatively large opening area are disposed in the end portion regions ER' in the tire circumferential direction.

Specifically, in the configurations of FIGS. 29 to 31, by the average value Ae' of the opening area of the recessed portions 8 in the end portion regions ER' in the tire circumferential direction and the average value Ac' of the opening area of the recessed portions 8 in the central portion region (reference sign is omitted in the drawings) in the tire circumferential direction having the relationship Ac'<Ae', the condition Sc'<Se' for the opening area of the recessed portions 8 is satisfied. Additionally, the average values Ae', Ac' of the opening area of the recessed portions 8 preferably have the relationship $1.5 \leq Ae'/Ac' \leq 4.0$, and more preferably the relationship $2.0 \leq Ae'/Ac' \leq 3.0$. In a configuration in which all of the recessed portions 8 are disposed in the end portion regions ER', Ac' is equal to zero, thus satisfying the conditions Ac'<Ae' and Sc'<Se'.

Additionally, in a configuration in which the land portions are formed by a plurality of blocks arranged in the tire circumferential direction (see FIG. 2), 70% or more, and preferably 80% or more of the blocks 5 that compose one row of blocks preferably satisfy the conditions Ac'<Ae' and Sc'<Se' for the opening area of the recessed portions 8 described above. In the entire tread, it is only required that at least one land portion satisfies the conditions for the row of blocks.

In the configuration described above, the recessed portions 8 with a relatively large opening area are disposed in the end portion regions ER' of the blocks 5 where a film of water is likely to form during travel on icy road surfaces. Thus, a film of water on the road contact surface is efficiently absorbed due to the water absorbing function provided by the recessed portions 8. As a result, the adhesive properties of the block road contact surface to an icy road surface is improved, and the braking performance on ice of the tire is improved. Additionally, by disposing the recessed portions 8 with a relatively small opening area in the central portion region, the contact patch area of the central portion region of the block 5 is ensured and the braking performance on ice of the tire is improved.

For example, in the configuration of FIG. 29, one block 5 of the shoulder land portion 33 includes a total of 16 recessed portions 8 in the contact patch. Specifically, eight recessed portions 8 are individually disposed in the end portion regions ER' and the central portion region (reference sign is omitted in the drawings) in the tire circumferential direction. The recessed portions 8 have the same opening shape. Additionally, the recessed portions 8 with a relatively large opening area are disposed in the end portion regions ER', and the recessed portions 8 with a relatively small opening area are disposed in the central portion region. As a result, the condition Ac'<Ae' for the opening area of the recessed portions 8 and the condition Sc'<Se' for the opening area ratio are both satisfied in each region. Additionally, in the entire shoulder land portion 33, the recessed portions 8 in all of the blocks 5 satisfy the conditions Ac'<Ae' and Sc'<Se' described above.

In the configuration of FIG. 30, one block 5 of the second land portion 32 located outward in the tire circumferential direction (see FIG. 25) includes a total of 16 recessed portions 8 in the contact patch. Specifically, eight recessed portions 8 are individually disposed in the front and back end portion regions ER' and the central portion region (reference sign is omitted in the drawings) in the tire circumferential direction. The recessed portions 8 have the same opening shape. Additionally, the recessed portions 8 with a relatively large opening area are disposed in the end portion regions ER', and the recessed portions 8 with a relatively small opening area are disposed in the central portion region. As a result, the condition Ac'<Ae' for the opening area of the recessed portions 8 and the condition Sc'<Se' for the opening area ratio are both satisfied in each region. Additionally, in the entire second land portion 32, the recessed portions 8 in all of the blocks 5 satisfy the conditions Ac'<Ae' and Sc'<Se' described above.

In the configuration of FIG. 31, one block 5 of center land portion 31 includes a total of 36 recessed portions 8 in the contact patch. Specifically, 18 recessed portions 8 are individually disposed in the front and back end portion regions ER' and the central portion region (reference sign is omitted in the drawings) in the tire circumferential direction. The recessed portions 8 have the same opening shape. Additionally, the recessed portions 8 with a relatively large opening area are disposed in the end portion regions ER', and the recessed portions 8 with a relatively small opening area are disposed in the central portion region. As a result, the condition Ac'<Ae' for the opening area of the recessed portions 8 and the condition Sc'<Se' for the opening area ratio are both satisfied in each region. Additionally, in the entire center land portion 31, the recessed portions 8 in all of the blocks 5 satisfy the conditions Ac'<Ae' and Sc'<Se' described above.

In the configuration described above, 70% or more, and preferably 80% or more of the recessed portion 8 disposed in the end portion regions ER' in the tire circumferential direction preferably have an opening area larger than the average value. In other words, the recessed portions 8 with a larger opening area are disposed in the end portion regions ER'. As a result, a film of water formed in the end portion regions ER' during travel on icy road surfaces is efficiently absorbed by the larger recessed portions 8. For example, in the configurations of FIGS. 29 to 31, one block 5 is provided with two types of recessed portions 8 with differing opening areas, and all of the recessed portions 8 with the larger opening area are disposed in the end portion regions ER'. Additionally, only the larger recessed portions 8 are disposed in the end portion regions ER', and only the smaller recessed portions 8 are disposed in the central portion region. As a result, the regions are provided with recessed portions 8 of different sizes. As a result, a distinctive arrangement pattern of the recessed portions 8 is formed.

However, the present technology is not limited to such a configuration and at least one of the smaller recessed portions may be disposed in the end portion regions ER'.

Additionally, in the configuration described above, the recessed portions 8 with an opening area greater than the average value are preferably disposed on the outermost side of the continuous contact patch in the tire circumferential direction. In other words, the recessed portions 8 with an opening area greater than the average value are disposed closer to the edge portions of the land portions 31 to 33 than the other smaller recessed portion 8. The edge portions of the land portions 31 to 33 are subject to high ground contact pressure and, during travel on icy road surfaces, a film of water is likely to form on the edge portions. Accordingly, by disposing the larger recessed portions 8 in the edge portions of the land portions 31 to 33, the film of water on the road contact surface is efficiently absorbed by the larger recessed portions 8. For example, in the configuration of FIGS. 30, 31, the larger recessed portions 8 are disposed along the edges of the block 5 proximal to the lug grooves 41, 42. Thus, the water absorbing function of the recessed portions 8 is enhanced.

Additionally, in the configuration described above, the land portions 31 to 33 are rows of blocks that include a plurality of blocks 5, and the recessed portions 8 with an opening area greater than the average value are preferably disposed in the corner portions of the blocks 5. The corner portions of the blocks 5 are subject to high ground contact pressure and, during travel on icy road surfaces, a film of water is likely to form on the edge portions. Accordingly, by disposing the recessed portions 8 in the corner portions of the blocks 5, a film of water formed on the road contact surface during travel on icy road surfaces is efficiently absorbed. For example, in the configuration of FIGS. 29 to 31, the larger recessed portions 8 are disposed in the blocks 5 in all of the corner portions formed where the circumferential grooves 21 to 23 and the lug grooves 41 to 43 meet (see FIG. 25). Thus, the water absorbing function of the recessed portions 8 is enhanced.

Note that in the configuration of FIGS. 29 to 31, the disposal number Nc' of recessed portions 8 in the central portion region of each block 5 and the disposal number Ne' of the recessed portions 8 in the end portion regions ER' are substantially the same, and the disposal densities of the recessed portions 8 in the regions are substantially the same. Additionally, the disposal numbers Ne', Nc' of the recessed portions 8 in each region preferably have the relationship 0.90≤Ne'/Nc'≤1.10. As a result, the recessed portions 8 are disposed in the blocks 5 with a uniform disposal density.

However, the present technology is not limited to such a configuration, and in addition to the condition Ac'<Ae' described above, the disposal numbers Ne', Nc' of the recessed portions 8 in each region may have the relationship 1.20≤Ne'/Nc', and more preferably the relationship 1.50≤Ne'/Nc'. In other words, in the end portion regions ER in the tire circumferential direction, the recessed portions 8 have a relatively large opening area and are disposed densely. As a result, the ratio Ae'/Ac' of the opening area of the recessed portions 8 in each region can be reduced while the condition Sc'<Se' for the opening area ratio of the recessed portions 8 in each region can be efficiently adjusted.

Effects

As described above, the pneumatic tire 1 is provided with, in the tread surface, the land portions 31 to 33 that include a rib or a plurality of blocks (see FIGS. 2, 25). The land portions 31 to 33 are provided with the plurality of narrow shallow grooves 7 and the plurality of recessed portions 8 in the contact patch (see FIGS. 3 and 4). Additionally, the opening area ratio Se of the recessed portions 8 in the end portion regions ER in the tire lateral direction of one continuous contact patch and the opening area ratio Sc of the recessed portions 8 in the central portion region in the tire lateral direction have the relationship Sc<Se, where the central portion region is defined as the region in the central portion in the tire lateral direction occupying 50% of the continuous contact patch of the land portions 31 to 33, and the end portion regions are defined as the regions in the left and right end portions in the tire lateral direction occupying 25%.

Such a configuration is advantageous because: (1) by the land portions 31 to 33 being provided with recessed portions 8 in the contact patch, the edge components of the land portions 31 to 33 are increased and the braking performance on ice of the tire is improved; and (2) by the opening area ratio of the recessed portions 8 being greater in the end portion regions ER in the tire lateral direction, the water absorbency of the road contact surface at the end portion regions ER where a film of water is likely to form is improved. Such a configuration is beneficial because the ground contact properties of the end portion regions ER are improved and braking performance on ice of the tire is improved. Additionally, (3) by the opening area ratio of the recessed portions 8 being smaller in the central portion region in the tire lateral direction, the contact patch area of the central portion region of the land portions 31 to 33 is ensured, and the braking performance on ice of the tire is improved. Additionally, (4) by the recessed portion 8 being shallow compared to the sipes (for example a linear sipe 6 or a circular sipe (not illustrated)) the rigidity of the land portions 31 to 33 is appropriate ensured. Thus, the braking performance on ice of the tire is ensured.

In the pneumatic tire 1, the opening area ratio Se of the recessed portions 8 in the end portion regions ER in the tire lateral direction and the opening area ratio Sc of the recessed portions 8 in the central portion region in the tire lateral direction have the relationship $1.50 \leq Se/Sc$. As a result, the ratio Se/Sc of the opening area ratios of the recessed portions 8 in each region is ensured, and the function provided by the non-uniform opening area of the recessed portions 8 is appropriately obtained.

Additionally, in the pneumatic tire 1, the disposal number Ne of the recessed portions 8 in the end portion regions ER in the tire lateral direction and the disposal number Nc of the recessed portions 8 in the central portion region in the tire lateral direction have the relationship Nc<Ne (see FIGS. 3, 6, and 7). In such a configuration, by the recessed portions 8 being disposed densely in the end portion regions ER in the tire lateral direction, the water absorbency of the road contact surface at the end portion regions ER where a film of water is likely to form is improved. Such a configuration is beneficial because the ground contact properties of the end portion regions ER are improved and braking performance on ice of the tire is improved. Additionally, by the recessed portions 8 being disposed sparsely in the central portion region in the tire lateral direction, the contact patch area of the central portion region of the land portions 31 to 33 is ensured, and the braking performance on ice of the tire is improved.

Additionally, in the pneumatic tire 1, the disposal number Ne of the recessed portions 8 in the end portion regions ER in the tire lateral direction and the disposal number Nc of the recessed portions 8 in the central portion region in the tire lateral direction have the relationship $1.50 \leq Ne/Nc$ (see FIGS. 3, 6, and 7). Such a configuration is advantageous because the density of the recessed portions 8 in each region is made appropriate, and the function of improving the braking performance on ice of the tire is appropriately obtained.

Additionally, in the pneumatic tire 1, the disposal density Da of the recessed portions 8 in the entire region of one continuous contact patch is in the range $0.8$ unit/$cm^2 \leq Da \leq 4.0$ unit/cm'. Such a configuration is advantageous because the disposal density of the recessed portions 8 is made appropriate. In other words, by satisfying $0.8$ unit/cm'$\leq Da$, the disposal number of recessed portions 8 is ensured, and the film of water removing function of the recessed portion 8 is appropriately ensured. Additionally, by satisfying $Da \leq 4.0$ unit/$cm^2$, the contact patch area of the land portions 31 to 33 is appropriately ensured.

In the pneumatic tire 1, the land portions 31 to 33 include, in the contact patch, the plurality of sipes 6, and the recessed portions 8 are disposed spaced apart from the sipes 6 (for example, see FIG. 3). Such a configuration is advantageous because by disposing the recessed portions 8 and the sipes 6 separate from each other, the rigidity of the land portions 31 to 33 is ensured and the braking performance on ice of the tire is improved.

Additionally, in the pneumatic tire 1, the sipes 6 are disposed side by side in the tire circumferential direction defining the land portions 32 into a plurality of sections (for example, see FIG. 6). Additionally, the sections including the recessed portions 8 only in the central portion region in the tire lateral direction and the sections including the recessed portions 8 only in the end portion regions ER in the tire lateral direction are disposed alternately in the tire circumferential direction. Such a configuration is advantageous because by disposing the recessed portions 8 in a dispersed manner, the film of water absorbing function of the recessed portions 8 can be increased and the rigidity of the land portions can be ensured. Additionally, by the consecutive sections including recessed portions, a film of water on the road contact surface is efficiently absorbed and the braking performance on ice of the tire is improved.

Additionally, in the pneumatic tire 1, the sipes 6 are disposed side by side in the tire circumferential direction to divide each of the land portions 31 to 33 into a plurality of sections. Additionally, at least one of a discretionary pair of adjacent sections includes a recessed portion 8 in the end portion regions ER in the tire lateral direction (see FIGS. 3 and 7). Such a configuration is advantageous because, by the recessed portions 8 being disposed densely in the end portion regions ER in the tire lateral direction, a film of water on the road contact surface is efficiently absorbed and the braking performance on ice of the tire is improved.

Additionally, in the pneumatic tire 1, the sipes 6 are disposed side by side in the tire circumferential direction to divide each of the land portions 31 to 33 into a plurality of sections. Three adjacent sections include a section including a recessed portion 8 in the end portion regions ER in the tire lateral direction and a section including a recessed portion 8 in the central portion region in the tire lateral direction (for example, see FIGS. 3 and 6). Such a configuration is advantageous because the recessed portions 8 are disposed dispersedly throughout the end portion regions and the central portion region of the land portions 31 to 33.

Additionally, in the pneumatic tire 1, the sipes 6 are disposed side by side in the tire circumferential direction to divide each of the land portions 31 to 33 into a plurality of sections. Three discretionary sections adjacent in the tire circumferential direction include a section including a recessed portion 8 and a section without a recessed portion 8 (see FIG. 7). In such a configuration, by disposing a section without a recessed portion 8, the recessed portions 8 are disposed in a dispersed manner. Such a configuration is advantageous because the contact patch area of the land portions 31 to 33 is ensured, and the braking performance on ice of the tire is improved.

Additionally, in the pneumatic tire 1, the land portions 31 to 33 are rows of blocks that each include a plurality of blocks 5, and the recessed portions 8 are disposed in the corner portions of the blocks 5 (see FIGS. 3, 6, and 7). In such a configuration, the recessed portions 8 are disposed in the corner portions of the blocks 5 where the ground contact pressure is high and a film of water is likely to form. Such a configuration is advantageous because a film of water on the road contact surface is efficiently absorbed and the braking performance on ice of the tire is improved.

Additionally, in the pneumatic tire 1, the land portions 31 to 33 are rows of blocks that includes a plurality of blocks 5, and the recessed portions 8 are not disposed in the end portions of blocks 5 in the tire circumferential direction or the central portion region in the tire lateral direction (see FIGS. 3, 6, and 7). Such a configuration is advantageous because the contact patch area and the rigidity of the end portions of the blocks on the leading side and trailing side are ensured, and the braking performance on ice of the tire is improved.

Additionally, in the pneumatic tire 1, the opening area of the recessed portion 8 ranges from 2.5 mm² to 10 mm². Such a configuration is advantageous because the opening area of the recessed portions 8 is made appropriate. In other words, by the opening area of the recessed portions 8 being 2.5 mm² or greater, the edge function and the water absorbency of the recessed portions 8 are ensured. Additionally, by the opening area of the recessed portions 8 being 10 mm² or less, the contact patch area and the rigidity of the land portions 31 to 33 are ensured.

In the pneumatic tire 1, the recessed portions 8 have a circular (see FIG. 4) or elliptical shape (not illustrated) in the contact patch of the land portions 31 to 33. Such a configuration is advantageous because compared to a configuration (not illustrated) in which the recessed portions 8 have a polygonal shape, uneven wear of the contact patch of the land portions 31 to 33 can be suppressed.

In the pneumatic tire 1, the wall angle α of the recessed portions 8 is in the range −85 degrees≤α≤95 degrees (see FIG. 5). Such a configuration is advantageous because the edge function of the recessed portions 8 is improved.

Additionally, in the pneumatic tire 1, the depth Hd of the recessed portions 8 and the groove depth Hg of the narrow shallow grooves 7 have the relationship 0.5≤Hd/Hg≤1.5 (see FIG. 5). Such a configuration is advantageous because the depth Hd of the recessed portions 8 is made appropriate. In other words, by satisfying 0.5≤Hd/Hg, the water absorbing function of the recessed portions 8 is ensured. Additionally, by satisfying Hd/Hg≤1.5, a decrease in rigidity of the land portions 31 to 33 caused by the recessed portions 8 being too deep relative to the narrow shallow grooves 7 can be suppressed.

In the pneumatic tire 1, at least one recessed portion 8 is disposed in a position that corresponds to a vent hole of a tire mold (not illustrated). Such a configuration is advantageous because the vent hole is effectively utilized, and the number of unnecessary recesses are reduced in the contact patch of the land portions 31 to 33, which allows the contact patch area of the land portions 31 to 33 to be appropriately ensured.

In the pneumatic tire 1, the average value Ae of the opening area of the recessed portions 8 in the end portion regions ER in the tire lateral direction and the average value Ac of the opening area of the recessed portions 8 in the central portion region in the tire lateral direction have the relationship Ac<Ae (see FIGS. 25 to 28). In such a configuration, by the recessed portions 8 with a relatively large opening area being disposed in the end portion regions ER of the blocks 5 where a film of water is likely to form during travel on icy road surfaces, a film of water on the road contact surface with an icy road surface is efficiently absorbed. Such a configuration is advantageous because the adhesive properties of the block road contact surface to an icy road surface are improved, and the braking performance on ice of the tire is improved. Additionally, by disposing the recessed portions 8 with a relatively small opening area in the central portion region, the contact patch area of the central portion region of the block 5 is ensured and the braking performance on ice of the tire is improved.

In the pneumatic tire 1, the average value Ae of the opening area of the recessed portions 8 in the end portion regions ER in the tire lateral direction and the average value Ac of the opening area of the recessed portions 8 in the central portion region in the tire lateral direction have the relationship 1.5≤Ae/Ac≤4.0. Such a configuration is advantageous because the ratio Ae/Ac of the opening area of the recessed portions 8 in each region is made appropriate. In other words, by satisfying 1.5≤Ae/Ac, the ratio Ae/Ac of the opening area of the recessed portions 8 in each region is ensured, and the function provided by the recessed portions 8 of improving the braking performance on ice of the tire is appropriately obtained. Additionally, by satisfying Ae/Ac≤4.0, the ratio Ae/Ac of the opening area is kept from being excessive, and uneven wear of the blocks 5 is suppressed.

In the pneumatic tire 1, the land portions 31 to 33 include a plurality of types of recessed portions 8 with differing opening areas, and 70% or more of the recessed portions 8 disposed in the end portion regions ER in tire lateral direction have an opening area larger than the average value of the opening area of the recessed portions 8 disposed in the continuous contact patch (see FIGS. 26 to 28). Such a configuration is advantageous because a film of water at the end portion regions ER is efficiently absorbed by the larger recessed portions 8, thus the braking performance on ice of the tire is improved.

In the pneumatic tire 1, the land portions 31 to 33 include a plurality of types of recessed portions 8 with differing opening areas, and the recessed portions 8 with a larger opening area than the average value of the opening area of the recessed portions 8 disposed in the continuous contact patch are disposed on the outermost side of the continuous contact patch in the tire lateral direction (see FIGS. 26 to 28). Such a configuration is advantageous because a film of water at the end portion regions ER is efficiently absorbed by the larger recessed portions 8, thus the braking performance on ice of the tire is improved.

Additionally, in the pneumatic tire 1, the land portions 31 to 33 include a plurality of sipes 6 and a plurality of types of recessed portion 8 with differing opening areas. The plurality of sipes 6 are disposed side by side in the tire circumferential direction and divide the continuous contact patches of the land portions 31 to 33 into a plurality of sections (see FIGS. 26 to 28). The recessed portions 8 with an opening area larger than the average value of the opening area of the recessed portions 8 disposed in the continuous contact patch are disposed in at least one of three discretionary sections adjacent in the tire circumferential direction. Such a configuration is advantageous because by disposing the larger recessed portions 8 in a dispersed manner in the tire circumferential direction, the function of absorbing a film of water on the road contact surface provided by the recessed portions 8 is appropriately ensured.

Additionally, in the pneumatic tire 1, the land portions 31 to 33 are rows of blocks that each include a plurality of blocks 5 and a plurality of types of recessed portion 8 with differing opening areas (see FIGS. 26 to 28). The recessed portions 8 with an opening area larger than the average value of the opening area of the recessed portions 8 disposed in the continuous contact patch are disposed in the corner portions of the blocks 5. Such a configuration is advantageous because a film of water on the road contact surface is efficiently absorbed.

The pneumatic tire 1 is provided with, in the tread surface, the land portions 31 to 33 that include a plurality of blocks 5 (see FIG. 2). The land portions 31 to 33 are provided with the plurality of narrow shallow grooves 7 and the plurality of recessed portions 8 in the contact patch (see FIG. 4). Additionally, the opening area ratio Se' of the recessed portions 8 in the end portion regions ER' in the tire circumferential direction of one continuous contact patch and the opening area ratio Sc' of the recessed portions 8 in the central portion region in the tire circumferential direction have the relationship Sc'<Se', where the central portion region is defined as the region in the central portion in the tire circumferential direction occupying 50% of the continuous contact patch, and the end portion regions are defined as the regions in the front and back end portions in the tire circumferential direction occupying 25% (see FIGS. 22 to 24).

Such a configuration is advantageous because: (1) by the land portions 31 to 33 being provided with recessed portions 8 in the contact patch, the edge components of the land portions 31 to 33 are increased and the braking performance on ice of the tire is improved; and (2) by the opening area ratio of the recessed portions 8 being greater in the end portion regions ER' in the tire circumferential direction, the water absorbency of the road contact surface at the end portion regions ER' where a film of water is likely to form is improved. Such a configuration is beneficial because the ground contact properties of the end portion regions ER' are improved and braking performance on ice of the tire is improved. Additionally, (3) by the opening area ratio of the recessed portions 8 being smaller in the central portion region in the tire circumferential direction, the contact patch area of the central portion region of the land portions 31 to 33 is ensured, and the braking performance on ice of the tire is improved. Additionally, (4) by the recessed portion 8 being shallow compared to the sipes (for example a linear sipe 6 or a circular sipe (not illustrated)) the rigidity of the land portions 31 to 33 is appropriate ensured. Thus, the braking performance on ice of the tire is ensured.

Additionally, in the pneumatic tire 1, the disposal number Ne' of the recessed portions 8 in the end portion regions ER' in the tire circumferential direction and the disposal number Nc' of the recessed portions 8 in the central portion region in the tire circumferential direction have the relationship Nc'<Ne' (see FIGS. 22 to 24). In such a configuration, by the recessed portions 8 being disposed densely in the end portion regions ER' in the tire circumferential direction, the water absorbency of the road contact surface at the end portion regions ER' where a film of water is likely to form is improved. Such a configuration is beneficial because the ground contact properties of the end portion regions ER' are improved and braking performance on ice of the tire is improved. Additionally, by the recessed portions 8 being disposed sparsely in the central portion region in the tire circumferential direction, the contact patch area of the central portion region of the land portions 31 to 33 is ensured, and the braking performance on ice of the tire is improved.

In the pneumatic tire 1, the average value Ae' of the opening area of the recessed portions 8 in the end portion regions ER' in the tire circumferential direction and the average value Ac' of the opening area of the recessed portions 8 in the central portion region in the tire circumferential direction have the relationship Ac'<Ae' (see FIGS. 22 to 24). In such a configuration, by the recessed portions 8 with a relatively large opening area being disposed in the end portion regions ER' of the blocks 5 where a film of water is likely to form during travel on icy road surfaces, a film of water on the road contact surface with an icy road surface is efficiently absorbed. Such a configuration is advantageous because the adhesive properties of the block road contact surface to an icy road surface are improved, and the braking performance on ice of the tire is improved. Additionally, by disposing the recessed portions 8 with a relatively small opening area in the central portion region, the contact patch area of the central portion region of the block 5 is ensured and the braking performance on ice of the tire is improved.

EXAMPLES

FIGS. 32A-32B include a table showing results 1 of performance testing of pneumatic tires according to the embodiments of the present technology. FIGS. 33A-33B include a table showing results 2 of performance testing of pneumatic tires according to the embodiments of the present technology.

In the performance testing, a plurality of different test tires were evaluated for braking performance on ice. The test tires with a tire size of 195/65R15 were mounted on an applicable rim as defined by JATMA, and an air pressure of 230 kPa and the maximum load as defined by JATMA were applied to the test tires. Also, the test tires were mounted on a test vehicle, a front-engine front-drive (FF) sedan with an engine displacement of 1600 cc.

Evaluations related to braking performance on ice were conducted by driving the test vehicle on a predetermined icy road surface, and braking distance from a driving speed of 40 km/h was measured. Then, the measurement results were expressed as index values with the result of the conventional example being defined as the reference (100). In this evaluation, larger values are preferable.

In reference to FIGS. 32A-32B, the test tires of Examples 1 to 11 have the configuration illustrated in FIGS. 1 and 2, and the blocks 5 of the land portions 31 to 33 include the sipes 6, the narrow shallow grooves 7, and the recessed portions 8. Additionally, as illustrated in FIG. 4, the linear narrow shallow grooves 7 are disposed parallel with each other at an incline with respect to the tire circumferential direction and penetrate through the blocks 5. The narrow shallow grooves 7 have a groove width and a groove depth of 0.3 mm. All of the recessed portions 8 in the tread surface have the same shape and a fixed opening area. Additionally, in all of the blocks 5, the disposal number Ne of the recessed portions 8 in the end portion regions ER in the tire lateral direction and the disposal number Nc of the recessed portions 8 in the central portion region in the tire lateral direction have the relationship Nc<Ne. The disposal density Da and the disposal number ratio Ne/Nc of the recessed portions 8 are the average value of all of blocks 5 in the tread surface. The opening area ratio Se/Sc of the recessed portions 8 is substantially equal to the disposal number ratio Ne/Nc of the recessed portions 8 in each region.

In reference to FIGS. 33A-33B, the test tires of Examples 12 to 22 have the configuration illustrated in FIGS. 1 and 25, and the blocks 5 of the land portions 31 to 33 include the sipes 6, the narrow shallow grooves 7, and the recessed portions 8. Additionally, as illustrated in FIG. 4, the linear narrow shallow grooves 7 are disposed parallel with each other at an incline with respect to the tire circumferential direction and penetrate through the blocks 5. The narrow shallow grooves 7 have a groove width and a groove depth of 0.3 mm. All of the blocks 5 in the tread surface are provided with two types of a plurality of recessed portions 8 with differing opening areas. All of the recessed portions 8 have the same shape. Additionally, the recessed portions 8 with the larger opening area Ae are disposed in the end portion regions ER of the blocks 5 (see FIGS. 26 to 28), and the recessed portions 8 with the smaller opening area Ac are disposed in the central portion region of the blocks 5. In one of the blocks 5, the disposal number Ne of recessed portions 8 in the end portion regions ER is substantially equal to the disposal number Nc of recessed portions 8 in the central portion region. As a result, the opening area ratio Se/Sc of the recessed portions is substantially equal to the opening area ratio Ae/Ac of the larger and smaller recessed portions 8. The disposal density Da of the recessed portions 8 is the average value of all of blocks 5 in the tread surface.

The test tire according to the conventional example had the configuration of Example 2 except that while the blocks 5 include the sipes 6 and the narrow shallow grooves 7, the recessed portions 8 were not provided.

As shown in the test results, it can be seen that the braking performance on ice of the tire is improved in the test tires of Examples 1 to 22.

The invention claimed is:

1. A pneumatic tire comprising in a tread surface thereof a land portion that comprises a rib or a plurality of blocks,
   the land portion comprising in a contact patch thereof a plurality of narrow shallow grooves and a plurality of recessed portions, and
   an opening area ratio Se of the recessed portions in end portion regions in a tire lateral direction of one continuous contact patch in the land portion and an opening area ratio Sc of the recessed portions in a central portion region in the tire lateral direction having a relationship Sc<Se, where
   the central portion region is defined as a region in a central portion in the tire lateral direction occupying 50% of the continuous contact patch, and the end portion regions are defined as regions in left and right end portions in the tire lateral direction occupying 25%,
   the narrow shallow grooves have a groove depth of from 0.2 mm to 0.7 mm,
   a depth Hd of the recessed portions and a groove depth Hg of the narrow shallow grooves have the relationship 0.5≤Hd/Hg≤1.5, and
   a disposal density Da of the recessed portions in an entire region of the one continuous contact patch is in the range 0.8 unit/cm$^2$≤Da≤4.0 unit/cm$^2$.

2. The pneumatic tire according to claim 1, wherein the opening area ratio Se of the recessed portions in the end portion regions in the tire lateral direction and the opening area ratio Sc of the recessed portions in the central portion region in the tire lateral direction have a relationship 1.50≤Se/Sc.

3. The pneumatic tire according to claim 1, wherein a disposal number Ne of the recessed portions in the end portion regions in the tire lateral direction and a disposal number Nc of the recessed portions in the central portion region in the tire lateral direction have a relationship Nc<Ne.

4. The pneumatic tire according to claim 3, wherein the disposal number Ne of the recessed portions in the end portion regions in the tire lateral direction and the disposal number Nc of the recessed portions in the central portion region in the tire lateral direction have a relationship 1.50≤Ne/Nc.

5. The pneumatic tire according to claim 1, wherein the land portion comprises in the contact patch thereof a plurality of sipes, and the recessed portions are disposed spaced apart from the sipes.

6. The pneumatic tire according to claim 1, wherein
   a plurality of sipes are disposed side by side in a tire circumferential direction and divide the land portion into a plurality of sections, and
   a section comprising the recessed portions only in the central portion region in the tire lateral direction and a section comprising the recessed portions in only either of the end portion regions in the tire lateral direction are disposed alternately in the tire circumferential direction.

7. The pneumatic tire according to claim 1, wherein
   a plurality of sipes are disposed side by side in a tire circumferential direction and divide the land portion into a plurality of sections, and
   at least one of two discretionary adjacent sections of the plurality of sections comprises the recessed portions in the end portion regions in the tire lateral direction.

8. The pneumatic tire according to claim 1, wherein
   a plurality of sipes are disposed side by side in a tire circumferential direction and divide the land portion into a plurality of sections, and
   three discretionary sections adjacent in the tire circumferential direction of the plurality of sections comprise a section comprising the recessed portions in either of the end portion regions in the tire lateral direction and a section comprising the recessed portions in the central portion region in the tire lateral direction.

9. The pneumatic tire according to claim 1, wherein
   a plurality of sipes are disposed side by side in a tire circumferential direction and divide the land portion into a plurality of sections, and
   three discretionary sections adjacent in the tire circumferential direction of the plurality of sections comprise a section with the recessed portions and a section without the recessed portions.

10. The pneumatic tire according to claim 1, wherein the land portion is a row of blocks that comprises a plurality of blocks, and
    the recessed portions are disposed in corner portions of the blocks.

11. The pneumatic tire according to claim 1, wherein the land portion is a row of blocks that comprises a plurality of blocks, and
    the recessed portions are not disposed in end portions of the blocks in a tire circumferential direction or a central portion region of the blocks in the tire lateral direction.

12. The pneumatic tire according to claim 1, wherein the opening area of each of the recessed portions ranges from 2.5 mm$^2$ to 10 mm$^2$.

13. The pneumatic tire according to claim 1, wherein the recessed portions have a circular or elliptical shape at the contact patch of the land portion.

14. The pneumatic tire according to claim 1, wherein a wall angle α of the recessed portions is in a range −85 degrees≤α≤95 degrees.

15. The pneumatic tire according to claim 1, wherein at least one of the recessed portions is disposed at a position corresponding to a vent hole of a tire mold.

16. The pneumatic tire according to claim 1, wherein an average value Ae of the opening area of the recessed portions in the end portion regions in the tire lateral direction and an average value Ac of the opening area of the recessed portions in the central portion region in the tire lateral direction have a relationship Ac<Ae.

17. The pneumatic tire according to claim 16, wherein the average value Ae of the opening area of the recessed portions in the end portion regions in the tire lateral direction and the average value Ac of the opening area of the recessed portions in the central portion region in the tire lateral direction have a relationship 1.5≤Ae/Ac≤4.0.

18. The pneumatic tire according to claim 16, wherein
the land portion comprises a plurality of types of the recessed portions with differing opening areas, and
70% or more of the recessed portions disposed in the end portion regions in the tire lateral direction have a larger opening area than an average value of the opening area of the recessed portions disposed in the continuous contact patch.

19. The pneumatic tire according to claim 16, wherein
the land portion comprises a plurality of types of the recessed portions with differing opening areas, and
the recessed portions with an opening area larger than the average value of the opening area of the recessed portions disposed in the continuous contact patch are disposed on an outermost side of the continuous contact patch in the tire lateral direction.

20. The pneumatic tire according to claim 16, wherein
the land portion comprises a plurality of sipes that are disposed side by side in a tire circumferential direction and that divide the continuous contact patch of the land portion into a plurality of sections, and a plurality of types of the recessed portions with differing opening areas, and
the recessed portions with an opening area larger than the average value of the opening area of the recessed portions disposed in the continuous contact patch are disposed in at least one of three discretionary sections adjacent in the tire circumferential direction of the plurality of sections.

21. The pneumatic tire according to claim 16, wherein
the land portion is a row of blocks that comprises a plurality of blocks and comprises a plurality of types of the recessed portions with differing opening areas, and
the recessed portions with an opening area larger than the average value of the opening area of the recessed portions disposed in the continuous contact patch are disposed in corner portions of the blocks.

22. The pneumatic tire according to claim 1, wherein $0.5 \leq Hd/Hg \leq 1.5$.

23. A pneumatic tire comprising in a tread surface thereof a land portion that comprises a rib or a plurality of blocks,
the land portion comprising in a contact patch thereof a plurality of narrow shallow grooves and a plurality of recessed portions, and
an opening area ratio Se of the recessed portions in end portion regions in a tire lateral direction of one continuous contact patch in the land portion and an opening area ratio Sc of the recessed portions in a central portion region in the tire lateral direction having a relationship Sc<Se, where
the central portion region is defined as a region in a central portion in the tire lateral direction occupying 50% of the continuous contact patch, and the end portion regions are defined as regions in left and right end portions in the tire lateral direction occupying 25%,
the narrow shallow grooves have a groove depth of from 0.2 mm to 0.7 mm,
a depth Hd of the recessed portions and a groove depth Hg of the narrow shallow grooves have the relationship $0.5 \leq Hd/Hg \leq 1.5$, and
an average value Ae of the opening area of the recessed portions in the end portion regions in the tire lateral direction and an average value Ac of the opening area of the recessed portions in the central portion region in the tire lateral direction have a relationship Ac<Ae.

* * * * *